United States Patent
Lee et al.

(10) Patent No.: US 11,232,008 B2
(45) Date of Patent: Jan. 25, 2022

(54) METHOD OF OPERATING STORAGE DEVICE, STORAGE DEVICE PERFORMING THE SAME AND STORAGE SYSTEM INCLUDING THE SAME

(71) Applicant: Samsung Electronics Co., Ltd., Suwon-si (KR)

(72) Inventors: Kyungduk Lee, Seoul (KR); Younsoo Cheon, Hwaseong-si (KR); Jihwa Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 16/729,743

(22) Filed: Dec. 30, 2019

(65) Prior Publication Data

US 2020/0394114 A1 Dec. 17, 2020

(30) Foreign Application Priority Data

Jun. 14, 2019 (KR) ........................ 10-2019-0070989

(51) Int. Cl.
| | |
|---|---|
| *G06F 12/00* | (2006.01) |
| *G06F 11/30* | (2006.01) |
| *G06F 12/0882* | (2016.01) |
| *G06F 12/02* | (2006.01) |
| *G06F 11/07* | (2006.01) |
| *G06F 3/06* | (2006.01) |

(52) U.S. Cl.
CPC ........ *G06F 11/3058* (2013.01); *G06F 3/0614* (2013.01); *G06F 11/076* (2013.01); *G06F 11/3037* (2013.01); *G06F 12/0246* (2013.01); *G06F 12/0882* (2013.01)

(58) Field of Classification Search
None
See application file for complete search history.

(56) References Cited

U.S. PATENT DOCUMENTS

| | | | |
|---|---|---|---|
| 9,343,121 | B2 | 5/2016 | Jang et al. |
| 9,535,614 | B2 | 1/2017 | Reddy et al. |
| 9,645,177 | B2 | 5/2017 | Cohen et al. |
| 9,760,311 | B1 | 9/2017 | Amir et al. |
| 9,837,146 | B2 | 12/2017 | Yang et al. |
| 9,934,859 | B1 | 4/2018 | Swaminathan et al. |
| 10,007,311 | B2 | 6/2018 | Raghu et al. |
| 10,210,941 | B1 | 2/2019 | Chen et al. |

(Continued)

*Primary Examiner* — Daniel D Tsui
(74) *Attorney, Agent, or Firm* — Muir Patent Law, PLLC

(57) ABSTRACT

A method of operating a storage device including a plurality of nonvolatile memories, each of the plurality of nonvolatile memories including a temperature sensor, includes checking whether a predetermined temperature check cycle for the plurality of nonvolatile memories has been reached, monitoring, in response to the checking result, temperature information of at least some of the plurality of nonvolatile memories using the temperature sensor, obtaining standing time information of the plurality of nonvolatile memories by applying a temperature acceleration condition based on the monitored temperature information, and changing at least one of a plurality of driving parameters required for operating each of the plurality of nonvolatile memories based on at least one of the monitored temperature information and the obtained standing time information.

20 Claims, 16 Drawing Sheets

(56) References Cited

U.S. PATENT DOCUMENTS

| | | | |
|---|---|---|---|
| 2018/0095802 A1* | 4/2018 | Nguyen | G06F 9/5044 |
| 2018/0293029 A1 | 10/2018 | Achtenberg et al. | |
| 2018/0374547 A1 | 12/2018 | Yang et al. | |
| 2019/0043596 A1 | 2/2019 | Madraswala et al. | |
| 2019/0074283 A1 | 3/2019 | Amaki et al. | |
| 2021/0117125 A1* | 4/2021 | Hsieh | G06F 3/0688 |

* cited by examiner

METHOD OF OPERATING STORAGE DEVICE, STORAGE DEVICE PERFORMING THE SAME AND STORAGE SYSTEM INCLUDING THE SAME

CROSS-REFERENCE TO RELATED APPLICATION

This application claims priority under 35 USC § 119 to Korean Patent Application No. 10-2019-0070989, filed on Jun. 14, 2019 in the Korean Intellectual Property Office (KIPO), the contents of which are herein incorporated by reference in their entirety.

BACKGROUND

1. Technical Field

Example embodiments relate to semiconductor integrated circuits, and more particularly to a method of operating a storage device, the storage device performing the method, and a storage system including the storage device.

2. Description of the Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

These types of data storage devices may include nonvolatile memory devices, for example, flash memories. As the usage time of the data storage devices increases, a characteristic of the nonvolatile memory devices such as the flash memories included in the data storage devices may change due to temperature, and thus there may be a problem that an error occurs more frequently.

SUMMARY

At least one example embodiment of the present disclosure provides a method of operating a storage device capable of having improved or enhanced performance and reliability based on temperature monitoring.

At least one example embodiment of the present disclosure provides a storage device capable of having improved or enhanced performance and reliability based on temperature monitoring.

At least one example embodiment of the present disclosure provides a storage system including the storage device.

According to example embodiments, a method of operating a storage device including a plurality of nonvolatile memories, each of the plurality of nonvolatile memories including a temperature sensor includes a checking whether a predetermined temperature check cycle for the plurality of nonvolatile memories has been reached, monitoring, in response to a checking result of whether the predetermined temperature check cycle has been reached, temperature information of at least one of the plurality of nonvolatile memories, obtaining standing time information of each of the plurality of nonvolatile memories by applying a temperature acceleration condition based on the monitored temperature information, and changing at least one of a plurality of driving parameters required for operating each of the plurality of nonvolatile memories based on at least one of the monitored temperature information and the obtained standing time information.

According to example embodiments, a storage device includes a plurality of nonvolatile memories and a storage controller. Each of the plurality of nonvolatile memories includes a temperature sensor. The storage controller controls operations of the plurality of nonvolatile memories, checks whether a predetermined temperature check cycle for the plurality of nonvolatile memories has been reached, monitors, in response to a checking result of whether the predetermined temperature check cycle has been reached, temperature information of at least one of the plurality of nonvolatile memories using the temperature sensor, obtains standing time information of each of the plurality of nonvolatile memories by applying a temperature acceleration condition based on the monitored temperature information, and changes at least one of a plurality of driving parameters required for operating each of the plurality of nonvolatile memories based on at least one of the monitored temperature information and the obtained standing time information.

According to example embodiments, a storage system includes a host and a storage device accessed by the host and including a plurality of nonvolatile memories and a storage controller. Each of the plurality of nonvolatile memories includes a temperature sensor. The storage controller controls operations of the plurality of nonvolatile memories, checks whether a predetermined temperature check cycle for the plurality of nonvolatile memories has been reached, monitors, in response to a checking result of whether the predetermined temperature check cycle has been reached, temperature information of at least one of the plurality of nonvolatile memories using the temperature sensor, obtains standing time information of each of the plurality of nonvolatile memories by applying a temperature acceleration condition based on the monitored temperature information, and changes at least one of a plurality of driving parameters required for operating each of the plurality of nonvolatile memories based on at least one of the monitored temperature information and the obtained standing time information.

In the method of operating the storage device, the storage device and the storage system according to example embodiments, each of the plurality of nonvolatile memories includes the temperature sensor, the storage controller periodically monitors the temperature information of each of the plurality of nonvolatile memories using the temperature sensor without the external command, and the plurality of driving parameters required for operating the plurality of nonvolatile memories are adaptively changed for each nonvolatile memory based on the monitored temperature information. Accordingly, the storage device may have improved or enhanced performance and reliability.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
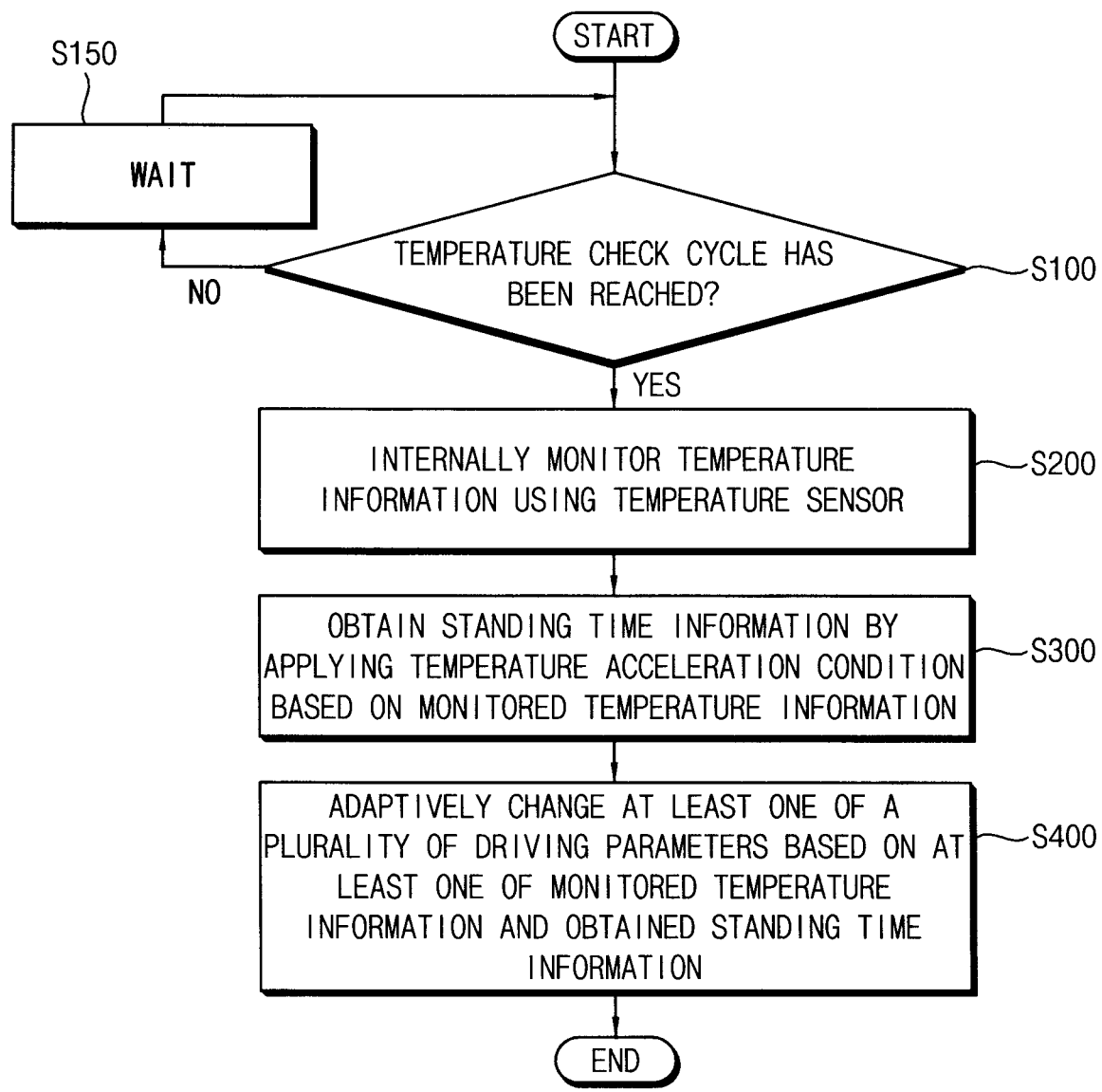
FIG. 1 is a flowchart illustrating a method of operating a storage device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating a storage device according to example embodiments.

Referring to FIG. 1, a storage device according to example embodiments may include a plurality of nonvolatile memories that store data and a storage controller that controls operations of the plurality of nonvolatile memories. In addition, each of the plurality of nonvolatile memories may include a temperature sensor. Configurations of the storage device and a storage system including the storage device will be described with reference to FIG. 2.

In a method of operating the storage device according to example embodiments, it is checked (or determined) whether a predetermined temperature check cycle (or period) for the plurality of nonvolatile memories has been reached (step S100). For example, the temperature check cycle may be set and stored when or while manufacturing the storage device, and may be changed based on a user setting signal received from the outside. In example embodiments, the predetermined temperature check cycle, after manufacturing of the storage device, may be set based on a user setting signal from the outside.

When the temperature check cycle has not been reached (step S100: NO), the storage device may wait until the temperature check cycle has been reached (step S150). In some example embodiments, the storage device may wait while performing at least one of general operations of the storage device, e.g., performing program/erase/read operations based on a command received from an external host, performing a garbage collection operation by itself without any command, or the like. In other example embodiments, the storage device may wait without performing the general operations.

When the temperature check cycle has been reached (step S100: YES), temperature information of at least some of the plurality of nonvolatile memories is internally monitored using the temperature sensor (step S200). In some example embodiments, the temperature information may be monitored from each of all of the plurality of nonvolatile memories. In other example embodiments, as will be described with reference to FIG. 14, the temperature information may be monitored from each of only some of the plurality of nonvolatile memories.

An operation of internally monitoring the temperature information may indicate that the temperature information is monitored by the storage controller itself without any command received from the external host. By monitoring the temperature information without an external command, performance degradation or deterioration of the storage device may be prevented.

Standing time information of the plurality of nonvolatile memories is obtained by applying a temperature acceleration condition based on the monitored temperature information (step S300). The standing time information may be associated with time in which the nonvolatile memories are left as neglected (i.e. not accessed), used or driven at a specific use condition (e.g., a temperature condition), and may be referred to as leaving time information, use time information or waiting time information. In an example embodiment, the standing time information may be determined for each of the nonvolatile memories using Equation 1.

$$Tu = \Sigma[Tcycle * TAF] \qquad \text{[Equation 1]}$$

In Equation 1, Tu denotes the standing time information, Tcycle denotes the temperature check cycle, and TAF denotes a temperature acceleration factor. The TAF may be a function of a temperature measured by the temperature sensor. The temperature check cycle Tcycle is adjusted by a factor of the TAF. According to the Equation 1, the adjusted temperature check cycle (i.e., a value of Tcycle*TAF) is summed to obtain the standing time information. In an example embodiment, the TAF may be empirically determined. For example, the TAF may be obtained based on Arrhenius equation, and a detailed description thereof will be omitted because this is widely known in the technical field of the storage device. In an example embodiment, the value of Tcycle*TAF is summed until the summed value reaches a predetermined value. However, example embodiments are not limited thereto, and TAF may be obtained based on at least one of various algorithms.

At least one of a plurality of driving parameters required for operating the plurality of nonvolatile memories is adaptively changed based on at least one of the monitored temperature information and the obtained standing time information (step S400). The at least one of the plurality of driving parameters is adaptively and selectively changed for each nonvolatile memory. For example, the driving parameters may be set and optimized for temperature and standing time. In some example embodiments, when the temperature information of each of all of the plurality of nonvolatile memories is monitored in step S200, each nonvolatile memory may change a driving parameter based on its own temperature information. In other example embodiments, when the temperature information of each of some of the plurality of nonvolatile memories is monitored in step S200, some nonvolatile memories may change driving parameters based on their own temperature information, and other nonvolatile memories may change driving parameters based on temperature information of a nonvolatile memory other than itself and a predefined table (PDT).

In some example embodiments, as will be described with reference to FIG. 5, the plurality of driving parameters may include parameters associated with defensive codes for the plurality of nonvolatile memories. In some example embodiments, as will be described with reference to FIG. 9, the plurality of driving parameters may include parameters associated with the general operations (e.g., the program/erase operations) of the plurality of nonvolatile memories.

Although not illustrated in FIG. 1, after the driving parameters are changed in step S400, the storage device may perform at least one of the general operations (e.g., the program/erase/read operations, the garbage collection operation, or the like) with and/or without a request from the external host based on the changed driving parameters.

In the method of operating the storage device according to example embodiments, each of the plurality of nonvolatile memories included in the storage device may include the temperature sensor, the storage controller included in the storage device may periodically monitor the temperature information of each of the plurality of nonvolatile memories using the temperature sensor without the external command, and the plurality of driving parameters required for operating the plurality of nonvolatile memories may be adaptively changed for each nonvolatile memory based on the monitored temperature information. Accordingly, the storage device may have improved or enhanced performance and reliability.

Figure 2:
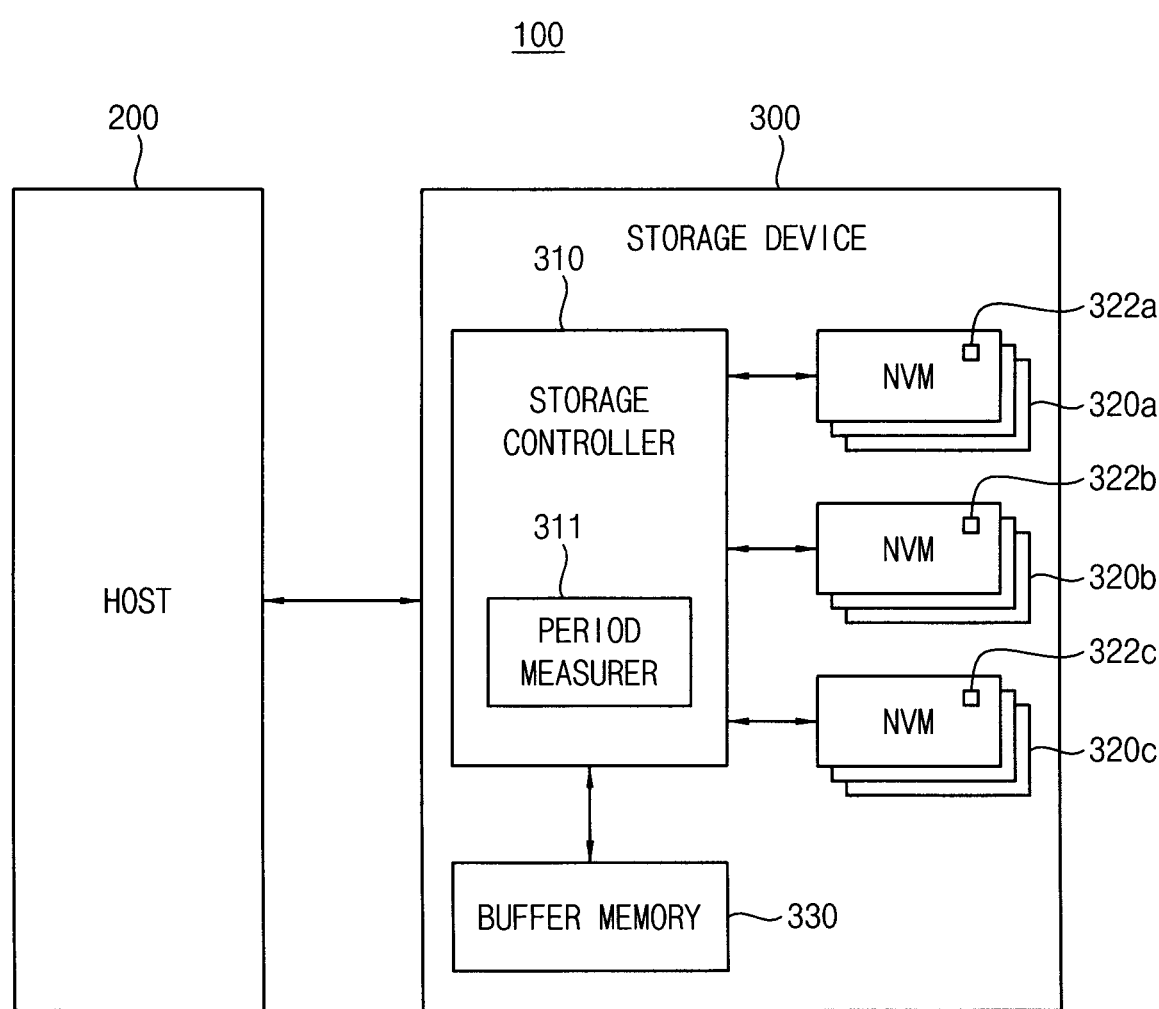
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host 200 and a storage device 300.

The host 200 controls overall operations of the storage system 100. Although not illustrated in FIG. 2, the host 200 may include a host processor and a host memory. The host processor may control an operation of the host 200. For example, the host processor may execute an operating system (OS). The host memory may store instructions and/or data that are executed and/or processed by the host processor. For example, the operating system executed by the host processor may include a file system for file management and a device driver for controlling peripheral devices including the storage device 300 at the operating system level.

The storage device 300 is accessed by the host 200. The storage device 300 includes a storage controller 310, a plurality of nonvolatile memories 320a, 320b and 320c, and a buffer memory 330.

The storage controller 310 may control an operation of the storage device 300 and/or operations of the plurality of nonvolatile memories 320a, 320b and 320c based on a command and data that are received from the host 200.

The storage controller 310 may perform the method described with reference to FIG. 1. For example, the storage controller 310 may check whether a predetermined temperature check cycle for the plurality of nonvolatile memories 320a, 320b and 320c has been reached, internally monitor temperature information of each of at least some of the plurality of nonvolatile memories 320a, 320b and 320c when the temperature check cycle has been reached, obtain (or calculate) standing time information of the plurality of nonvolatile memories 320a, 320b and 320c by applying a temperature acceleration condition based on the monitored temperature information, and adaptively change at least one of a plurality of driving parameters required for operating the storage device 300 and/or the plurality of nonvolatile memories 320a, 320b and 320c based on at least one of the monitored temperature information and the obtained (or calculated) standing time information. The at least one of the plurality of driving parameters may be adaptively and selectively changed for each nonvolatile memory. In other words, the storage controller 310 may monitor the temperature information independently of the control of the host 200, and may set optimized driving parameters based on the monitored temperature information. In addition, the storage controller 310 may also perform a method that will be described with reference to FIG. 18.

The storage controller 310 includes a period measurer 311 that checks or determines whether the temperature check cycle has been reached. For example, the period measurer 311 may include at least one of a timer and a counter. Although not illustrated in FIG. 2, the storage controller 310 may change the temperature check cycle based on a user setting signal received from the outside.

The plurality of nonvolatile memories 320a, 320b and 320c may store the plurality of data. For example, the plurality of nonvolatile memories 320a, 320b and 320c may store meta data, various user data, or the like.

The plurality of nonvolatile memories 320a, 320b and 320c include a plurality of temperature sensors 322a, 322b and 322c that monitor the temperature information. For example, each nonvolatile memory includes a temperature sensor. For example, each of the plurality of temperature sensors 322a, 322b and 322c may be an on-chip sensor (or on-die sensor) that includes an on-chip metal resistor, and thus may have the smaller and simpler configuration with the lower manufacturing cost.

Each nonvolatile memory may be disposed on a respective one semiconductor die, and may form a respective one nonvolatile memory chip. As will be described with reference to FIG. 13, the storage device 300 may include a plurality of memory packages, and each of the plurality of memory packages may include at least one of the plurality of nonvolatile memories 320a, 320b and 320c. In other words, each of the plurality of nonvolatile memories 320a, 320b and 320c may be included in a respective one of the plurality of memory packages.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some example embodiments, the temperature information may be periodically monitored for each nonvolatile memory, and may be stored and/or determined for each chip or die. For example, the temperature information may be periodically monitored during the runtime of the storage device 300, the temperature periodically monitored during the runtime of the storage device 300 may be converted by applying a temperature acceleration calculation, and the accumulated temperature information may be stored when the storage device 300 is powered off.

In some example embodiments, when a temperature of a specific nonvolatile memory is significantly higher or lower than an average temperature, temperature information of the specific nonvolatile memory may be appropriately treated or handled. For example, when temperature information is different only in a specific nonvolatile memory in the same memory package, the temperature information of the specific nonvolatile memory may be excluded or excepted, and the excluded temperature information of the specific nonvolatile memory may not be checked later.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a dynamic random access memory (DRAM), a static random access memory (SRAM), or the like.

In some example embodiments, the storage device 300 may be a solid state drive (SSD). In other example embodiments, the storage device 300 may be one of a universal flash storage (UFS), a multi media card (MMC), an embedded multi media card (eMMC), a secure digital (SD) card, a micro SD card, a memory stick, a chip card, a universal serial bus (USB) card, a smart card, a compact flash (CF) card, or the like.

In some example embodiments, the storage device 300 may be connected to the host 200 through a block accessible interface which may include, for example, a UFS bus, an eMMC bus, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host 200, for allowing the access in a unit of a memory block with respect to data stored in the plurality of nonvolatile memories 320a, 320b and 320c.

In some example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc. In other example embodiments, the storage system 100 may be any computing system, such as a personal computer (PC), a server computer, a workstation, a digital television, a set-top box, a navigation system, etc.

Figure 3:
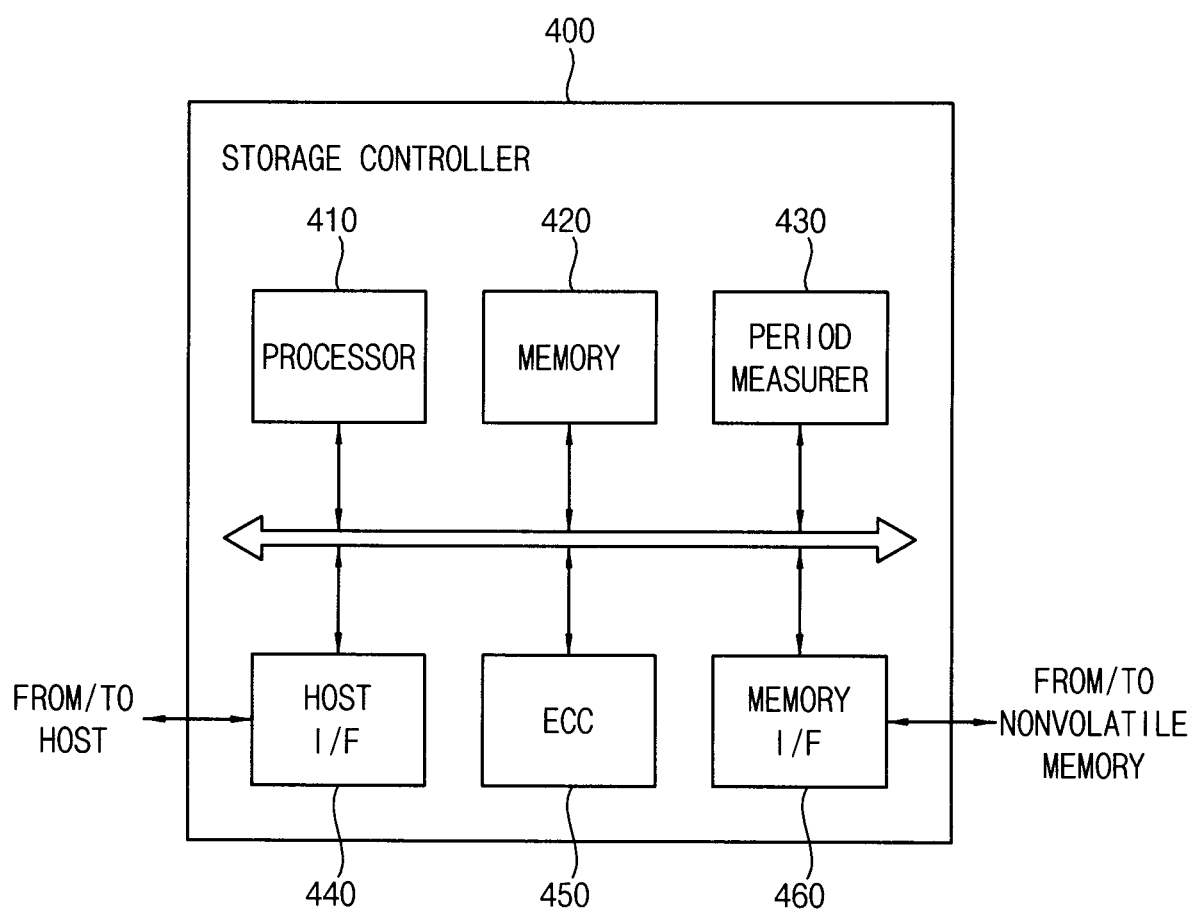
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 includes at least one processor 410, a memory 420, a period measurer 430, a host interface 440, an error correction code (ECC) block 450 and a memory interface 460. In an example embodiment, the storage controller 400 corresponds to the storage controller 310 of the storage device 300 in FIG. 2.

The processor 410 may control an operation of the storage controller 400 in response to a command received via the host interface 440 from a host (e.g., the host 200 in FIG. 2). In some example embodiments, the processor 410 may control respective components by employing firmware for operating a storage device (e.g., the storage device 300 in FIG. 2).

The memory 420 may store instructions and data executed and processed by the processor 410. For example, the memory 420 may be implemented with a volatile memory device with relatively small capacity and high speed, such as a static random access memory (SRAM), a cache memory, or the like.

The period measurer 430 that checks whether the temperature check cycle has been reached may be substantially the same as the period measurer 311 in FIG. 2. In some example embodiments, at least a part of the period measurer 430 may be implemented as hardware. In other example embodiments, at least a part of the period measurer 430 may be implemented as instruction codes or program routines (e.g., a software program) and may be stored in a memory.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host 200 and the storage device 300. The host interface 440 may provide an interface corresponding to a bus format of the host for communication between the host 200 and the storage device 300. In some example embodiments, the bus format of the host 200 may be a small computer system interface (SCSI) or a serial attached SCSI (SAS) interface. In other example embodiments, the bus format of the host 200 may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with nonvolatile memories (e.g., the nonvolatile memories 320a, 320b and 320c in FIG. 2). The memory interface 460 may transfer data to the nonvolatile memories 320a, 320b and 320c, or may receive data read from the nonvolatile memories 320a, 320b and 320c. In some example embodiments, the memory interface 460 may be connected to the nonvolatile memories 320a, 320b and 320c via one channel. In other example embodiments, the memory interface 460 may be connected to the nonvolatile memories 320a, 320b and 320c via two or more channels.

Figure 4:
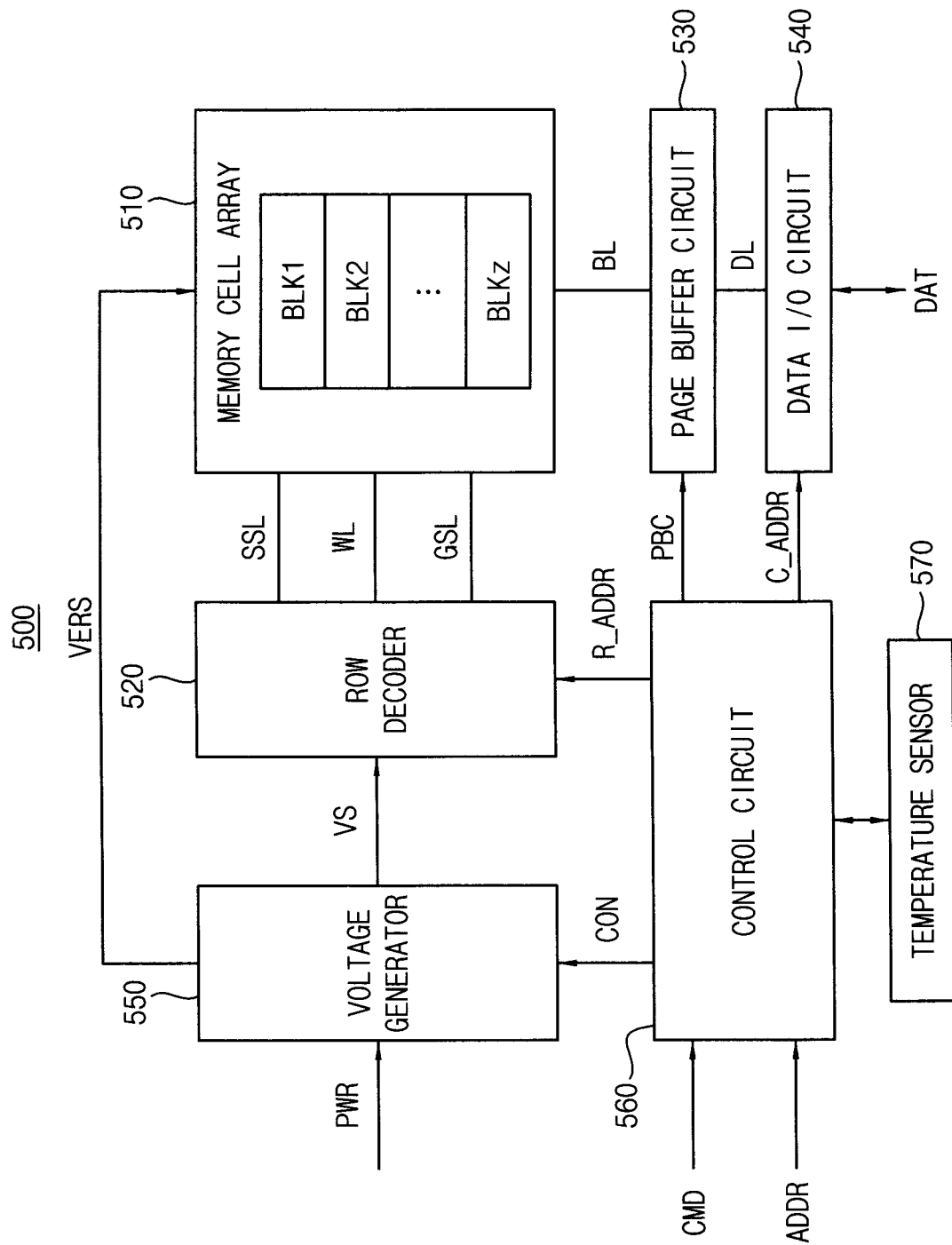
FIG. 4 is a block diagram illustrating an example of a nonvolatile memory included in a storage device according to example embodiments.

FIG. 4 is a block diagram illustrating an example of a nonvolatile memory included in a storage device according to example embodiments.

Referring to FIG. 4, a nonvolatile memory 500 includes a memory cell array 510, a row decoder 520, a page buffer circuit 530, a data input/output (I/O) circuit 540, a voltage generator 550, a control circuit 560 and a temperature sensor 570.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

In some example embodiments, the plurality of memory cells may be arranged in a two dimensional (2D) array structure or a three dimensional (3D) vertical array structure.

A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from the outside (e.g., the host 200 and/or the storage controller 310 in FIG. 2), and controls erasure, programming and read operations of the nonvolatile memory 500 based on the command CMD and the address ADDR. An erasure operation may include performing a sequence of erase loops. In an example embodiment, the erasure operation may be performed in a unit of a block. A program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate first control signals CON, which are used for controlling the voltage generator 550, and may generate second control signal PBC for controlling the page buffer circuit 530, based on the command CMD, and may generate a row address R_ADDR and a column address C_ADDR based on the address ADDR. The control circuit 560 may provide the row address R_ADDR to the row decoder 520 and may provide the column address C_ADDR to the data I/O circuit 540.

In addition, the control circuit 560 may change the driving parameter under the control of the storage controller 310. For example, the control circuit 560 may receive a temperature value from the storage controller 310, and may change the driving parameter by itself based on the received temperature value. For another example, the control circuit 560 may receive a value (e.g., changed voltage level, cycle, or the like) associated with the changed driving parameter from the storage controller 310, and may control the elements of the nonvolatile memory 500 based on the received value of the changed driving parameter.

The row decoder 520 may be connected to the memory cell array 510 via the plurality of string selection lines SSL, the plurality of wordlines WL and the plurality of ground selection lines GSL.

For example, in the data erase/write/read operations, the row decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the row decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the row decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the first control signals CON. The voltages VS may be applied to the plurality of string selection lines SSL, the plurality of wordlines WL and the plurality of ground selection lines GSL via the row decoder 520. In addition, the voltage generator 550 may generate an erase voltage VERS that is required for the data erase operation based on the power PWR and the first control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the row decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the row decoder 520. In addition, during the program verification operation, the voltage generator 550 may apply a program verification voltage to the selected wordline and may apply a verification pass voltage to the unselected wordlines via the row decoder 520.

In addition, during the normal read operation, the voltage generator 550 may apply a read voltage to the selected wordline and may apply a read pass voltage to the unselected wordlines via the row decoder 520. During the data recover read operation, the voltage generator 550 may apply the read voltage to a wordline adjacent to the selected wordline and may apply a recover read voltage to the selected wordline via the row decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

The temperature sensor 570 that monitors the temperature information may be substantially the same as the plurality of temperature sensors 322a, 322b and 322c in FIG. 2.

FIGS. 5, 6, 7, 8, 9, 10, 11 and 12 are flowcharts illustrating examples of adaptively changing at least one of a plurality of driving parameters in FIG. 1.

Figure 5:
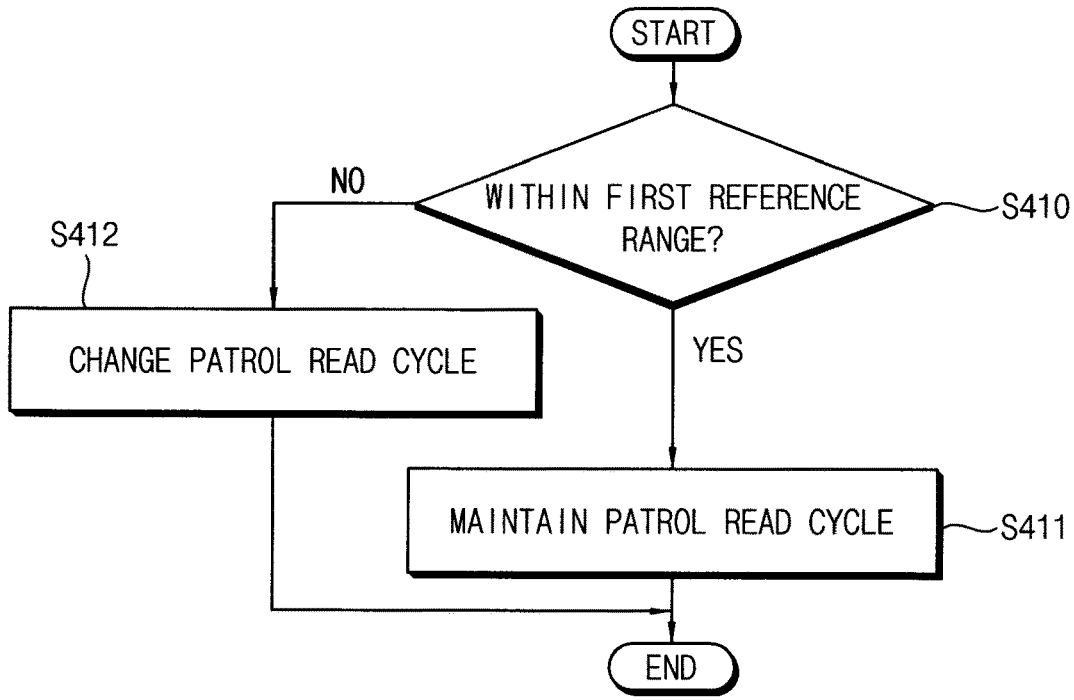
FIGS. 5, 6, 7, 8, 9, 10, 11 and 12 are flowcharts illustrating examples of adaptively changing at least one of a plurality of driving parameters in FIG. 1.
Figure 6:
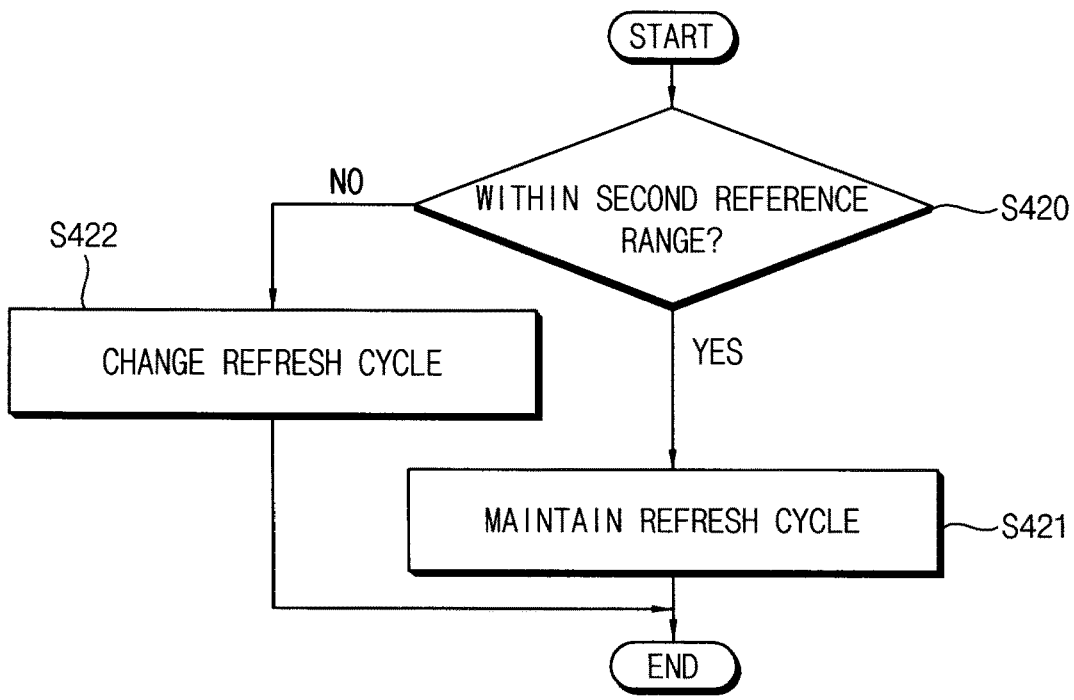
Figure 7:
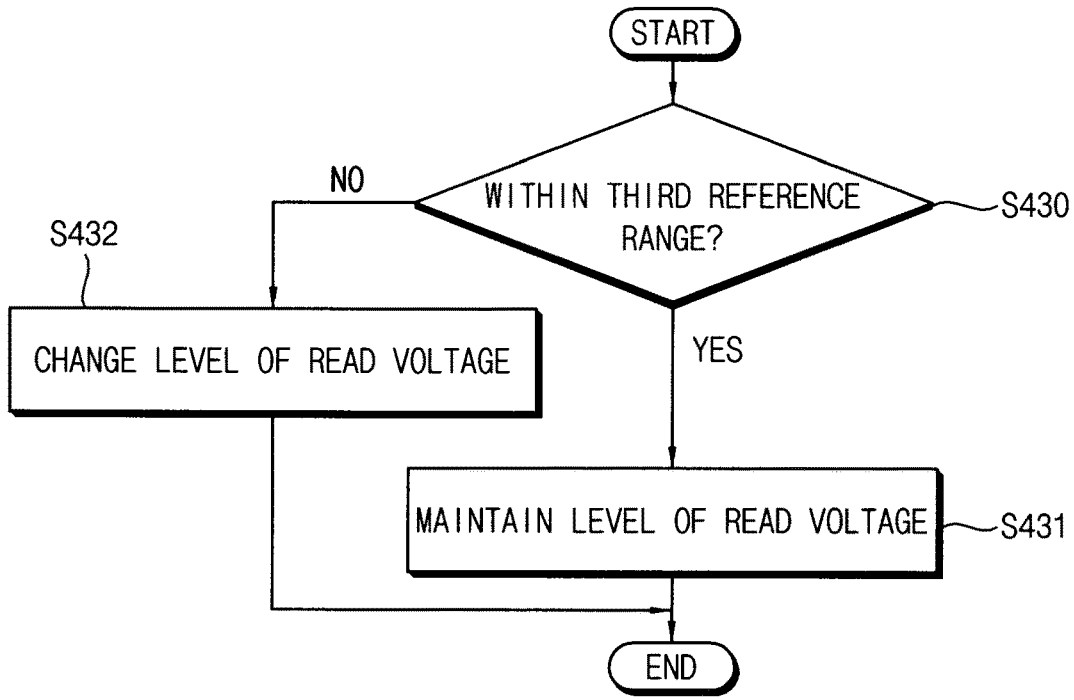
Figure 8:
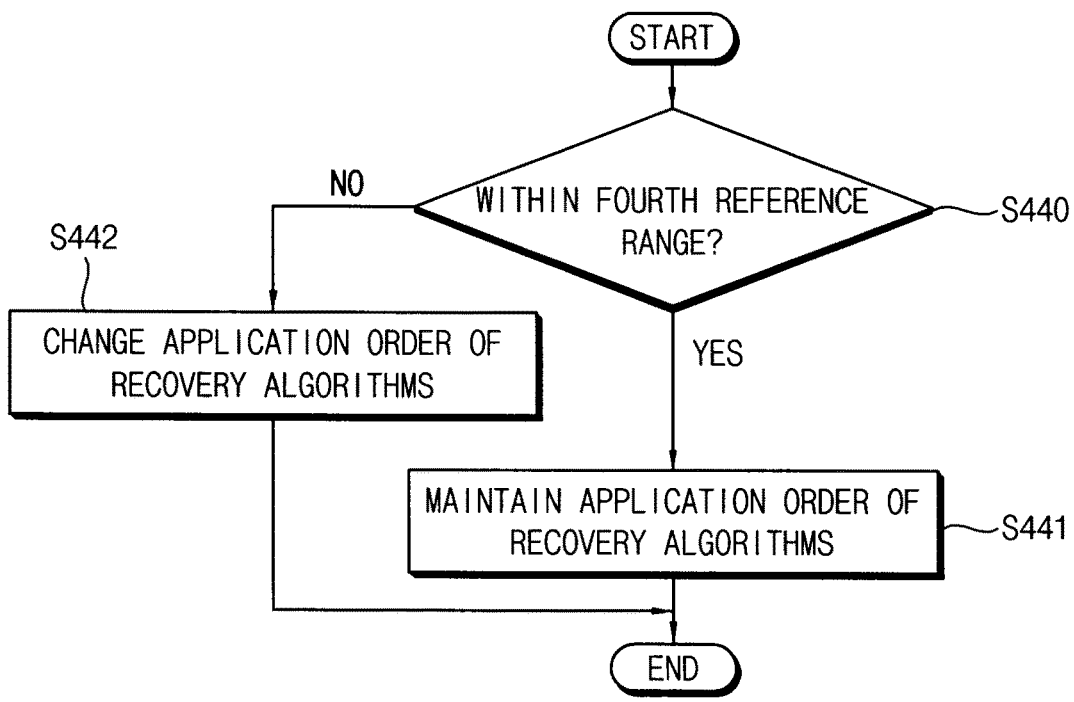

FIGS. 5, 6 and 7 illustrate examples where the plurality of driving parameters are associated with a prevention code among the defensive codes for the plurality of nonvolatile memories. In an example embodiment, the plurality of driving parameters associated with the prevention code may include a patrol read cycle, a refresh cycle or a read voltage based on a temperature bump table. FIG. 8 illustrates an example where the plurality of driving parameters are associated with a recovery code among the defensive codes for the plurality of nonvolatile memories. FIGS. 9, 10, 11 and 12 illustrate examples where the plurality of driving parameters are associated with the general operations (e.g., the program/erase operations) of the plurality of nonvolatile memories.

Referring to FIG. 5, an example of adaptively changing the at least one of the plurality of driving parameters (step S400) is adaptively changing of a patrol read cycle. In FIG. 5, it may be checked or determined whether first temperature information and/or first standing time information of a first nonvolatile memory among the plurality of nonvolatile memories are within a first reference range (step S410). When the first temperature information is within the first reference range for the first temperature information, when the first standing time information is within the first reference range for the first standing time information or when both the first temperature information and the first standing time information are within the first reference range for the first temperature information and within the first reference range for the first standing time information respectively (step S410: YES), a patrol read cycle associated with a patrol read operation for the first nonvolatile memory may be maintained (step S411). In an example embodiment, when at least one of the first temperature information and the first standing time information is out of the first reference range (step S410: NO), the patrol read cycle for the first nonvolatile memory may be changed (step S412). In an example embodiment, the first reference range for the first standing time information may have a value different from that of the first reference range for the first temperature information.

The patrol read operation may indicate an operation of checking whether stored data is abnormal by sequentially reading from a first memory block to a last memory block of a nonvolatile memory at each predetermined time interval, and a time interval between a time point of reading the first memory block and a time point of reading the last memory block may indicate the patrol read cycle. The patrol read operation may be referred to as a background scan reclaim operation.

In some example embodiments, the patrol read cycle may decrease as a temperature of the first nonvolatile memory increases, and the patrol read cycle may increase as the temperature of the first nonvolatile memory decreases. In other example embodiments, the patrol read cycle may decrease as a standing time of the first nonvolatile memory increases, and the patrol read cycle may increase as the standing time of the first nonvolatile memory decreases.

Referring to FIG. 6, an example of adaptively changing the at least one of the plurality of driving parameters (step S400) is adaptively changing of a refresh cycle. In FIG. 6, it may be checked whether the first temperature information and/or the first standing time information of the first nonvolatile memory are within a second reference range (step S420). When the first temperature information is within the second reference range for the first temperature information, when the first standing time information is within the second reference range for the first standing time information or when both the first temperature information and the first standing time information are within the second reference range for the first temperature information and within the second reference range for the first standing time information respectively (step S420: YES), a refresh cycle associated with a refresh operation for the first nonvolatile memory may be maintained (step S421). In an example embodiment, when at least one of the first temperature information and the first standing time information is out of the second reference range (step S420: NO), the refresh cycle for the first nonvolatile memory may be changed (step S422). For example, the second reference range may be equal to or different from the first reference range. In an example embodiment, the second reference range for the first standing time information may have a value different from that of the second reference range for the first temperature information.

The refresh operation may indicate an operation of reprogramming stored data before the stored data is damaged or corrupted, and a time interval between a time point of programming data and a time point of reprogramming the stored data may indicate the refresh cycle. The refresh operation may be referred to as a reclaim operation according to a standing time.

In some example embodiments, the refresh cycle may decrease as the temperature of the first nonvolatile memory increases, and the refresh cycle may increase as the temperature of the first nonvolatile memory decreases. In other example embodiments, the refresh cycle may decrease as the standing time of the first nonvolatile memory increases, and the refresh cycle may increase as the standing time of the first nonvolatile memory decreases.

Referring to FIG. 7, an example of adaptively changing the at least one of the plurality of driving parameters (step S400) is adaptively changing a level of a read voltage. In FIG. 7, it may be checked whether the first temperature information and/or the first standing time information of the first nonvolatile memory are within a third reference range (step S430). When the first temperature information is within the third reference range for the first temperature information, when the first standing time information is within the third reference range for the first standing time information, or when both the first temperature information and the first standing time information are within the third reference range for the first temperature information and the third reference for the first standing time information respectively (step S430: YES), a level of a read voltage associated with a read operation for the first nonvolatile memory may be maintained (step S431). In an example embodiment, when at least one of the first temperature information and the first standing time information is out of the third reference range (step S430: NO), the level of the read voltage for the first nonvolatile memory may be changed based on a temperature bump table (step S432). For example, the third reference range may be equal to one of the first and second reference ranges, or may be different from both the first and second reference ranges. In an example embodiment, the third reference range for the first standing time information may have a value different from that of the third reference range for the first temperature information.

The temperature bump table may indicate a relationship between a temperature and a level of a read voltage, and thus an optimal level of the read voltage of the first nonvolatile memory according to the temperature may be set or determined based on the temperature bump table. For example, when data in a memory block programmed at a relatively high temperature environment is to be read at a relatively low temperature environment, the level of the read voltage may decrease based on the temperature bump table.

Referring to FIG. 8, an example of adaptively changing the at least one of the plurality of driving parameters is adaptively changing an application order of a plurality of recovery algorithms (step S400). In FIG. 8, it may be checked whether the first temperature information and/or the first standing time information of the first nonvolatile memory are within a fourth reference range (step S440). When the first temperature information is within the fourth reference range for the first temperature information, when the first standing time information is within the fourth reference range for the first standing time information, or when both the first temperature information and the first standing time information are within the fourth reference range for the first temperature information and within the fourth reference range for the first standing time information respectively (step S440: YES), an application order (or sequence) of a plurality of recovery algorithms for the first nonvolatile memory may be maintained (step S441). In an example embodiment, the fourth reference range for the first standing time information may have a value different from that of the fourth reference range for the first temperature information. In an example embodiment, when at least one of the first temperature information and the first standing time information is out of the fourth reference range (step S440: NO), the application order of the plurality of recovery algorithms for the first nonvolatile memory may be changed (step S442). For example, the fourth reference range may be equal to one of the first, second and third reference ranges, or may be different from all of the first, second and third reference ranges.

The plurality of recovery algorithms may include various error correction codes described with reference to FIG. 3, and may include various codes for changing the level of the read voltage. For example, if three algorithms are set to be applied in an order of 1-2-3 at an initial operation time, the setting may be changed to be applied in an order of 2-1-3 in step S442.

In some example embodiments, as described with reference to FIG. 4, the first nonvolatile memory may include a plurality of memory blocks, and the application order of the plurality of recovery algorithms may be differently set for each memory block. In other example embodiments, each of the plurality of memory blocks may include a plurality of pages, and the application order of the plurality of recovery algorithms may be differently set for each page. In other words, the application order of the plurality of recovery algorithms may be set differently in a unit of a memory block or in a unit of a page.

Figure 9:
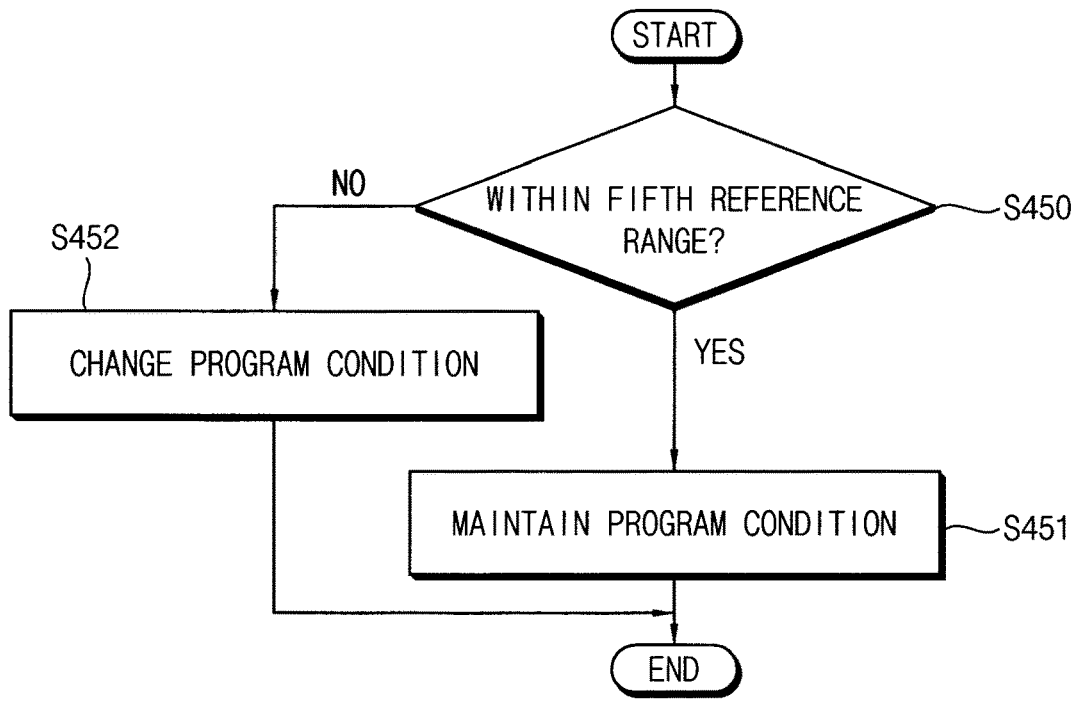

Referring to FIG. 9, an example of adaptively changing the at least one of the plurality of driving parameters is adaptively changing a program condition (step S400). In FIG. 9, it may be checked whether the first temperature information and/or the first standing time information of the first nonvolatile memory are within a fifth reference range (step S450). When the first temperature information is within the fifth reference range for the first temperature information, when the first standing time information is within the fifth reference range for the first standing time information or when both the first temperature information and the first standing time information are within the fifth reference range for the first temperature information and within the fifth reference range for the first temperature information respectively (step S450: YES), a program condition associated with a program operation for the first nonvolatile memory may be maintained (step S451). In an example embodiment, the fifth reference range for the first standing time information may have a value different from that of the fifth reference range for the first temperature information. In an example embodiment, when at least one of the first temperature information and the first standing time information is out of the fifth reference range (step S450: NO), the program condition for the first nonvolatile memory may be changed (step S452). For example, the fifth reference range may be equal to one of the first, second, third and fourth reference ranges, or may be different from all of the first, second, third and fourth reference ranges. For example, the program condition may include a level of a program voltage (e.g., a start program voltage level when programming with an incremental step pulse program (ISPP) scheme), a program verification condition (e.g., a level of a program verification voltage), a maximum program loop setting condition (e.g., a condition to determine as a program failure when it is not programmed even in a corresponding loop condition), or the like. At least one of such program conditions may be changed (e.g., may increase or decrease).

In some example embodiments, the level of the program voltage may decrease as the temperature of the first nonvolatile memory increases (e.g., at a hot temperature), and the level of the program voltage may increase as the temperature of the first nonvolatile memory decreases.

Figure 10:
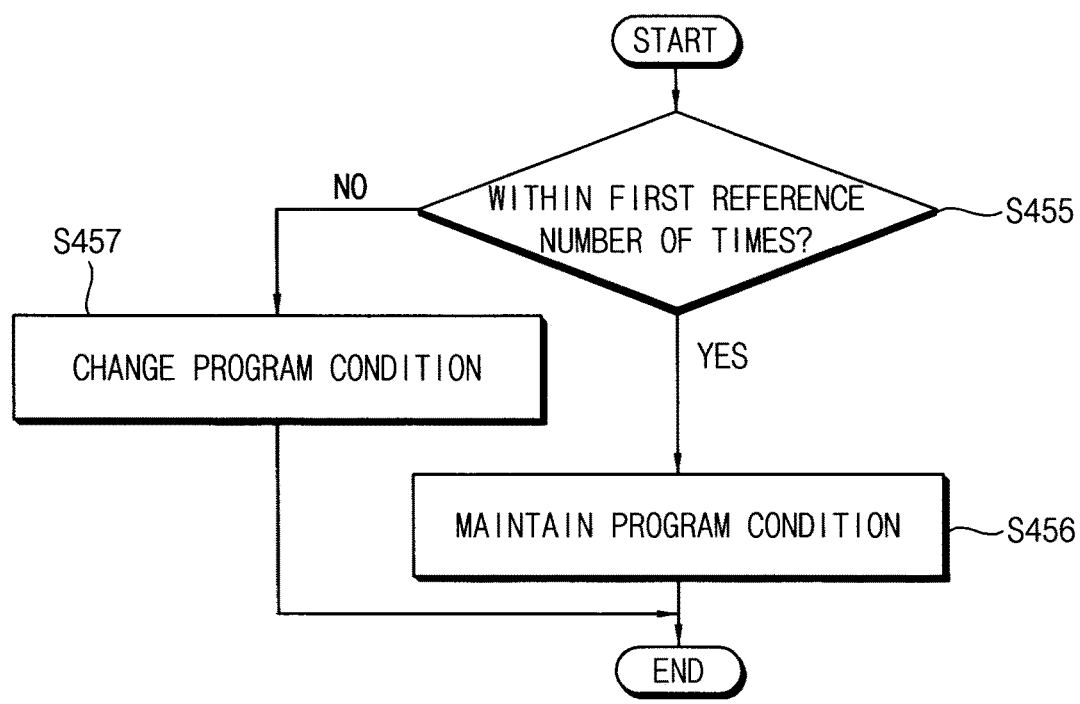

Referring to FIG. 10, an example of adaptively changing the at least one of the plurality of driving parameters is changing a program condition based on a program/erase cycle (step S400). In FIG. 10, the program/erase cycle indicating the number of times of the program/erase operations may be additionally considered along with the temperature information and/or the standing time information. For example, it may be checked whether a first program/erase cycle of the first nonvolatile memory is within a first reference number of times (step S455). When the first program/erase cycle of the first nonvolatile memory is within the first reference number of times (step S455: YES), the program condition for the first nonvolatile memory may be maintained (step S456). When the first program/erase cycle of the first nonvolatile memory exceeds the first reference number of times (step S455: NO), the program condition for the first nonvolatile memory may be changed (step S457).

In some example embodiments, the level of the program voltage may decrease as the first program/erase cycle of the first nonvolatile memory increases, and the level of the program voltage may increase as the first program/erase cycle of the first nonvolatile memory decreases.

Figure 11:
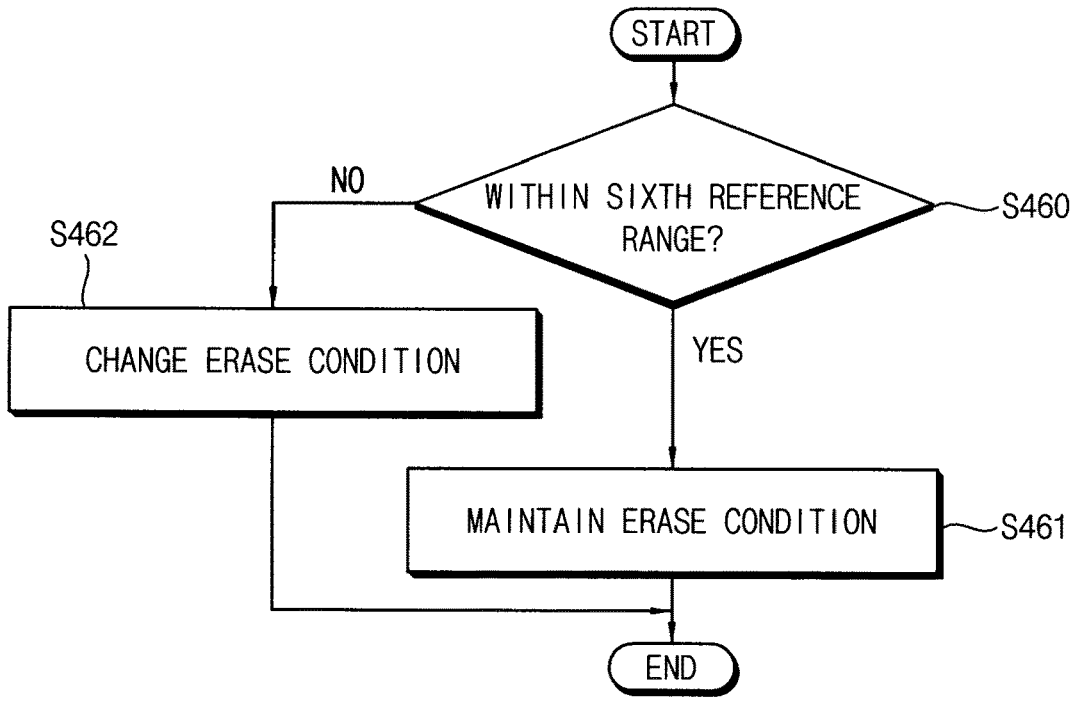

Referring to FIG. 11, an example of adaptively changing the at least one of the plurality of driving parameters is changing an erase condition (step S400). In FIG. 11, it may be checked or determined whether the first temperature information and/or the first standing time information of the first nonvolatile memory are within a sixth reference range (step S460). When the first temperature information is within the sixth reference range for the first temperature information, when the first standing time information is within the sixth reference range for the first standing time information, when both the first temperature information and the first standing time information are within the sixth reference range for the first temperature information and within the sixth reference range for the first standing time information respectively (step S460: YES), an erase condition associated with an erase operation for the first nonvolatile memory may be maintained (step S461). In an example embodiment, the sixth reference range for the first standing time information may have a value different from that of the sixth reference range for the first temperature information. In an example embodiment, when at least one of the first temperature information and the first standing time information is out of the sixth reference range (step S460: NO), the erase condition for the first nonvolatile memory may be changed (step S462). For example, the sixth reference range may be equal to one of the first, second, third, fourth and fifth reference ranges, or may be different from all of the first, second, third, fourth and fifth reference ranges. For example, the erase condition may include a level of an erase voltage (e.g., a start erase voltage level when erasing with an incremental step pulse erase (ISPE) scheme), an erase verification condition (e.g., a level of an erase verification voltage), a maximum erase loop setting condition (e.g., a condition to determine as an erase failure when it is not erased even in a corresponding loop condition), or the like. At least one of such erase conditions may be changed.

In some example embodiments, the level of the erase voltage may decrease as the temperature of the first nonvolatile memory decreases (e.g., at a cold temperature), and the level of the erase voltage may increase as the temperature of the first nonvolatile memory increases.

Figure 12:
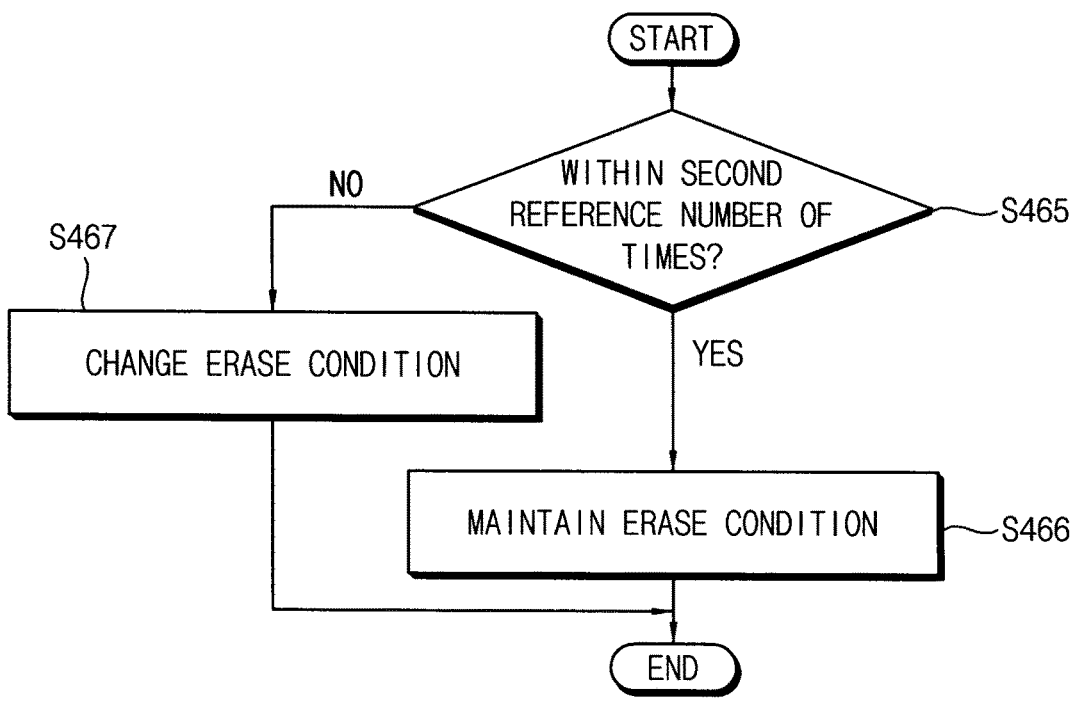

Referring to FIG. 12, an example of adaptively changing the at least one of the plurality of driving parameters is changing an erase condition based on the program/erase cycle (step S400). In FIG. 12, the program/erase cycle may be additionally considered. For example, it may be checked or determined whether the first program/erase cycle of the first nonvolatile memory is within a second reference number of times (step S465). When the first program/erase cycle of the first nonvolatile memory is within the second reference number of times (step S465: YES), the erase condition for the first nonvolatile memory may be maintained (step S466). When the first program/erase cycle of the first nonvolatile memory exceeds the second reference number of times (step S465: NO), the erase condition for the first nonvolatile memory may be changed (step S467). For example, the second reference number of times may be equal to or different from the first reference number of times.

In some example embodiments, the level of the erase voltage may decrease as the first program/erase cycle of the first nonvolatile memory decreases, and the level of the erase voltage may increase as the first program/erase cycle of the first nonvolatile memory increases. In other example embodiments, the level of the erase voltage may increase as the first program/erase cycle of the first nonvolatile memory decreases, and the level of the erase voltage may decrease as the first program/erase cycle of the first nonvolatile memory increases.

Although not illustrated in FIGS. 5, 6, 7, 8, 9, 10, 11 and 12, a dynamic thermal throttling (DTT) may be performed based on the monitored temperature information.

In some example embodiments, two or more examples described with reference to FIGS. 5, 6, 7, 8, 9, 10, 11 and 12 may be combined to implement the method of operating the storage device according to example embodiments. In this case, two or more driving parameters may be changed. In an example embodiment, two or more driving parameters may be substantially simultaneously or concurrently changed.

Although example embodiments have been described with reference to FIGS. 5, 6, 7, 8, 9, 10, 11 and 12 based on examples where only the driving parameters for the first nonvolatile memory are changed, example embodiments are not limited thereto, and driving parameters for nonvolatile memories other than the first nonvolatile memory among the plurality of nonvolatile memories may also be changed in a similar manner. Particularly, when the temperature information are monitored from all of the plurality of nonvolatile memories, driving parameters for each of all of the plurality of nonvolatile memories may be changed, and thus the plurality of nonvolatile memories may have different driving parameters.

Although example embodiments have been described with reference to FIGS. 5, 6, 7, 8, 9, 10, 11 and 12 based on examples where each drive parameter is changed based on one reference range (or reference value) or one reference number of times, example embodiments are not limited thereto, and a driving parameter may be changed based on a plurality of reference ranges or a plurality of reference number of times. In addition, example embodiments have been described with reference to FIGS. 5, 6, 7, 8, 9, 10, 11 and 12 based on specific manners of changing specific driving parameters, but example embodiments are not limited thereto, and a manner of changing a driving parameter may be implemented in a various way.

As described above, the cycle and/or order of the defensive codes may be adaptively applied based on the temperature information and/or standing time information for each nonvolatile memory, and the read/program/erase operations may be performed with the optimized read level, program conditions and/or erase conditions that are compensated based on temperature variations. Thus, the storage device may have improved or enhanced performance and reliability.

Figure 13:
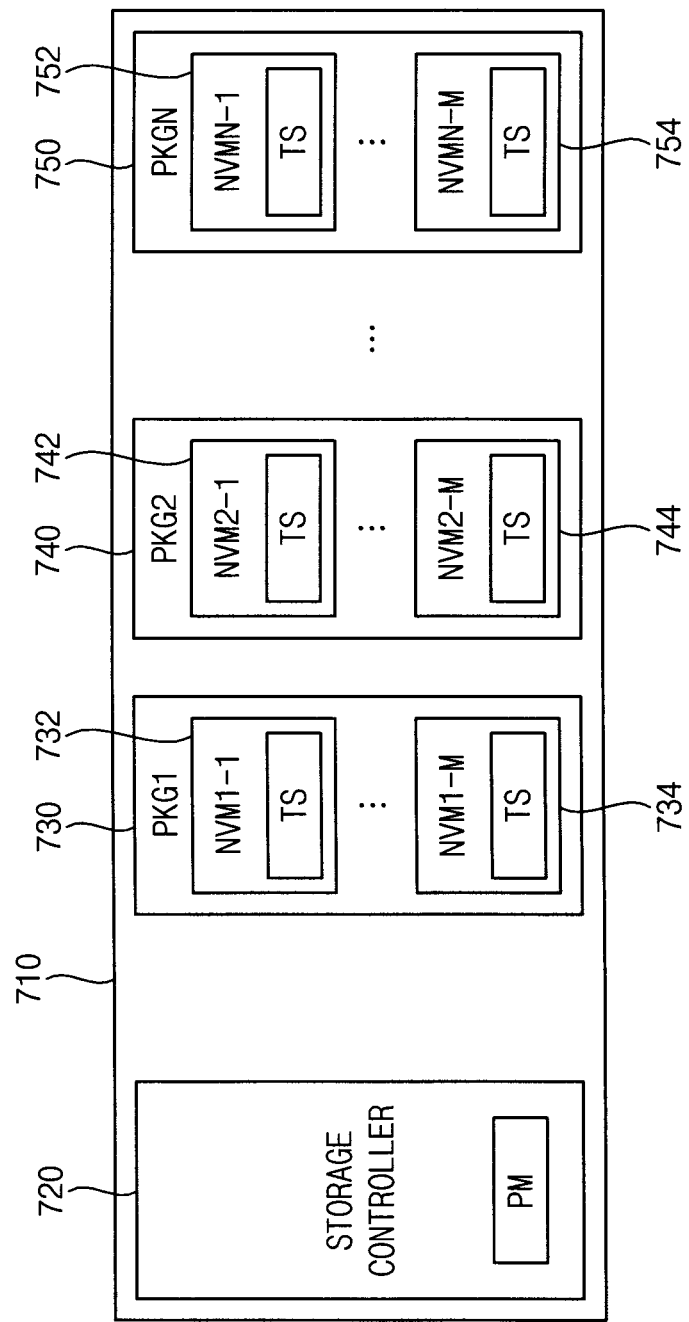
FIG. 13 is a plan view of an example in which a storage controller and nonvolatile memories are disposed in a storage device according to example embodiments.

FIG. 13 is a plan view of an example in which a storage controller and nonvolatile memories are disposed in a storage device according to example embodiments.

Referring to FIG. 13, a storage device includes a printed circuit board (PCB) 710, a storage controller 720 and a plurality of memory packages (PKG1, PKG2, . . . , PKGN) 730, 740 and 750. For convenience of illustration, a buffer memory (e.g., the buffer memory 330 in FIG. 2) is omitted.

The storage controller 720 may be substantially the same as the storage controller 310 in FIG. 2 and the storage controller 400 of FIG. 3, and may include a period measurer PM that checks whether the temperature check period has been reached. The plurality of memory packages 730, 740 and 750 may include a plurality of nonvolatile memories (NVM1-1, . . . , NVM1-M, NVM2-1, . . . , NVM2-M, NVMN-1, . . . , NVMN-M) 732, 734, 743, 744, 752 and 754. The plurality of nonvolatile memories 732, 734, 743, 744, 752 and 754 may be substantially the same as the plurality of nonvolatile memories 320a, 320b and 320c in FIG. 2 and the nonvolatile memory of FIG. 4, and each of the plurality of nonvolatile memories 732, 734, 743, 744, 752 and 754 may include a temperature sensor TS that monitors the temperature information.

The storage controller 720 and the plurality of memory packages 730, 740 and 750 may be mounted on the printed circuit board 710. Due to size or space limits (or constraints), it may be difficult to uniformly arrange the plurality of memory packages 730, 740 and 750 on the printed circuit board 710, and thus there may be a memory package or nonvolatile memory that is relatively close to or far from the storage controller 720 within the storage device.

Although FIG. 13 illustrates an example where N memory packages each of which includes M nonvolatile memories (each of N and M is a natural number greater than or equal to two), example embodiments are not limited thereto, and the number of memory packages and the number of nonvolatile memories may be changed. In addition, although FIG. 13 illustrates an example where the memory packages 730, 740 and 750 are disposed only on a first surface (e.g., a front surface) of the printed circuit board 710, example embodiments are not limited thereto, and memory packages may be further disposed on a second surface (e.g., a back surface) of the printed circuit board 710 opposite the first surface.

Figure 14:
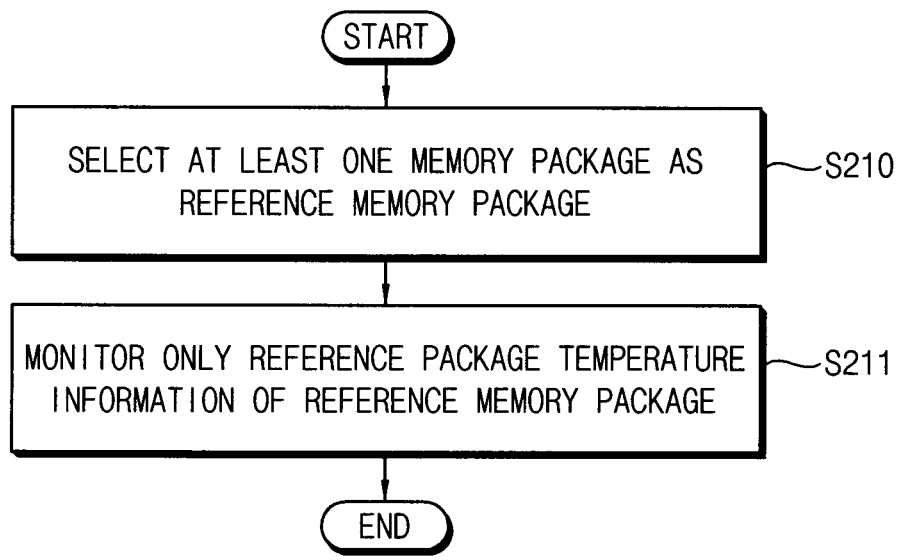
FIGS. 14, 15, 16 and 17 are flowcharts illustrating examples of internally monitoring temperature information in FIG. 1 and examples of adaptively changing at least one of a plurality of driving parameters in FIG. 1.
Figure 15:
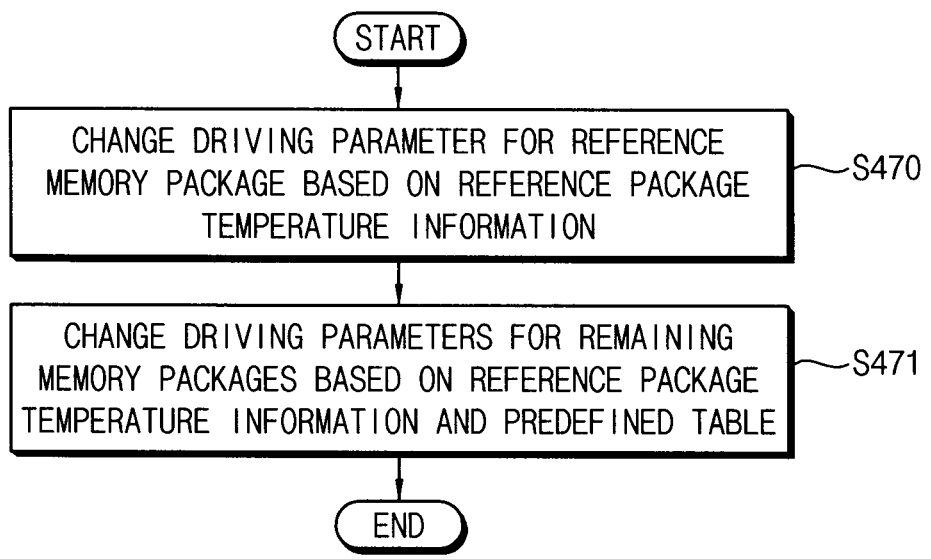
Figure 16:
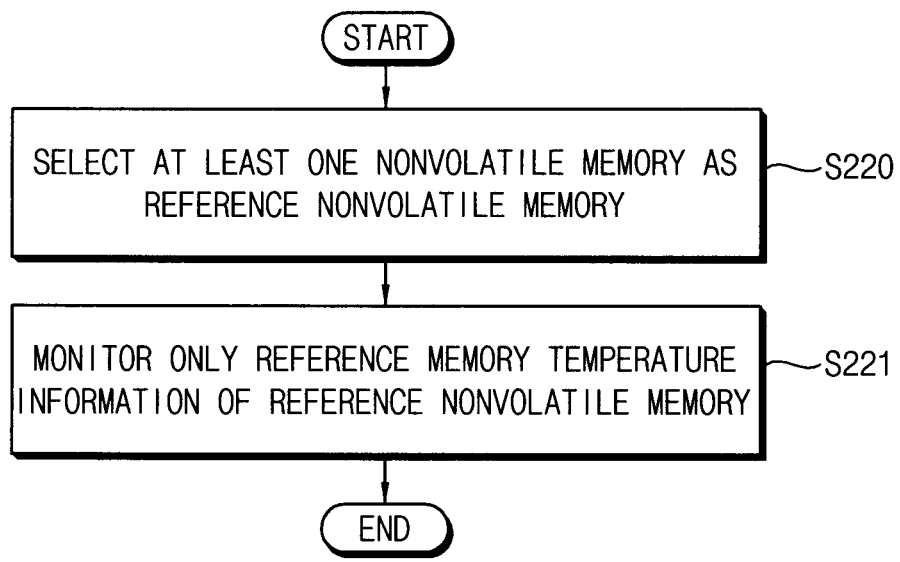
Figure 17:
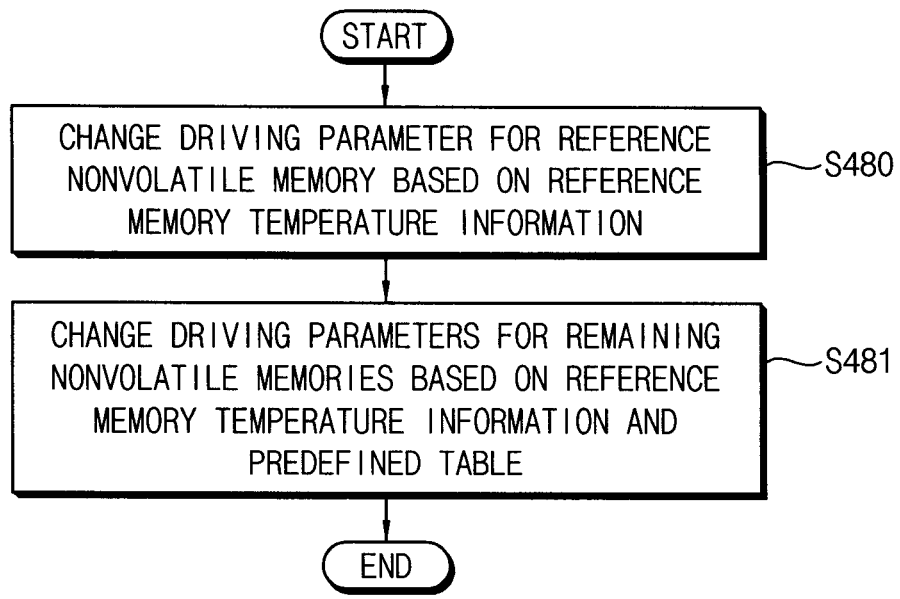

FIGS. 14, 15, 16 and 17 are flowcharts illustrating examples of internally monitoring temperature information in FIG. 1 and examples of adaptively changing at least one of a plurality of driving parameters in FIG. 1. FIGS. 14 and 16 illustrate the examples of internally monitoring the temperature information, and FIGS. 15 and 17 illustrate the examples of adaptively changing the at least one of the plurality of driving parameters.

Referring to FIGS. 13 and 14, when the storage controller 720 internally monitors the temperature information (step S200), at least one of the plurality of memory packages 730, 740 and 750 may be selected as a reference memory package (step S210). For example, a memory package disposed closest to the storage controller among the plurality of memory packages may be selected as the reference memory package. In the arrangement of FIG. 13, the first memory package 730 may be selected as the reference memory package. In some example embodiments, two or more memory packages may be selected as the reference memory package.

Only reference package temperature information of the reference memory package may be monitored (step S211). For example, only temperature information of at least some (e.g., all or some) of nonvolatile memories included in the reference memory package may be monitored. In other words, the temperature information may be monitored from only some of the plurality of nonvolatile memories.

Referring to FIG. 15, when the storage controller 720 adaptively changes the at least one of the plurality of driving parameters (step S400), a driving parameter required for operating the reference memory package (e.g., a driving parameter for the nonvolatile memories included in the reference memory package) may be changed based on the reference package temperature information (step S470), and driving parameters required for operating remaining memory packages other than the reference memory package (e.g., driving parameters for nonvolatile memories included in the remaining memory packages) may be changed based on the reference package temperature information and a predefined table (step S471). For example, during the program/read operations, only the temperature information of the reference memory package may be periodically checked, and temperature compensation may be performed on the other memory packages using the predefined table without checking the temperature information thereof. The predefined table may include corresponding temperature information for each package and/or memory according to reference temperature information.

Each of steps S470 and S471 may be implemented with at least one of the examples described with reference to FIGS. 5, 6, 7, 8, 9, 10, 11 and 12.

Referring to FIG. 16, when the temperature information (step S200) is internally monitored, at least one of the plurality of nonvolatile memories may be selected as a reference nonvolatile memory (step S220). For example, the reference nonvolatile memory may be a specific nonvolatile memory included in a specific memory package, may be several nonvolatile memories included in several memory packages, or may be several nonvolatile memories included in a specific memory package.

Only reference memory temperature information of the reference nonvolatile memory may be monitored (step S221). In other words, the temperature information may be monitored from only some of the plurality of nonvolatile memories.

Referring to FIG. 17, when the at least one of the plurality of driving parameters is adaptively changed (step S400), a driving parameter required for operating the reference nonvolatile memory may be changed based on the reference memory temperature information (step S480), and driving parameters required for operating remaining nonvolatile memories other than the reference nonvolatile memory may be changed based on the reference memory temperature information and a predefined table (step S481). Each of steps S480 and S481 may be implemented with at least one of the examples described with reference to FIGS. 5, 6, 7, 8, 9, 10, 11 and 12.

In some example embodiments, the example described with reference to FIGS. 14 and 15 and the example described with reference to FIGS. 16 and 17 may be combined to implement the method of operating the storage device according to example embodiments.

Figure 18:
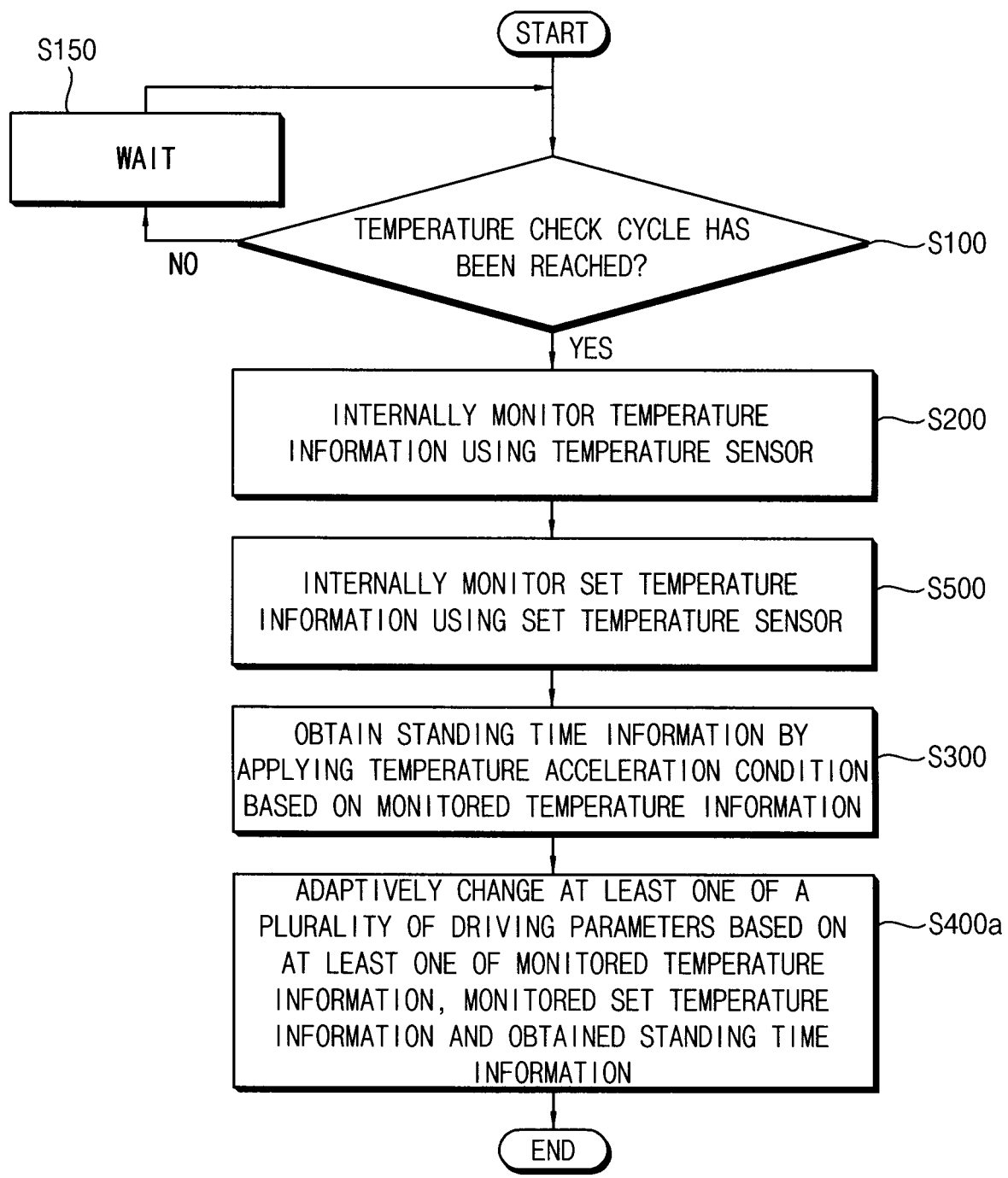
FIG. 18 is a flowchart illustrating a method of operating a storage device according to example embodiments.

FIG. 18 is a flowchart illustrating a method of operating a storage device according to example embodiments. The descriptions repeated with FIG. 1 will be omitted.

Referring to FIG. 18, a storage device according to example embodiments includes a storage controller and a plurality of nonvolatile memories each of which includes a temperature sensor. The storage device may further include a set temperature sensor that is different, distinguished and distinct from the temperature sensors of the plurality of nonvolatile memories.

In a method of operating the storage device according to example embodiments, steps S100, S150, S200 and S300 in FIG. 18 may be substantially the same as steps S100, S150, S200 and S300 in FIG. 1, respectively.

When the temperature check cycle has been reached (step S100: YES), temperature information of at least one memory package is internally monitored with a temperature sensor integrated therein (step 200) and set temperature information of the storage device is internally monitored using the set temperature sensor (step S500). Step S500 may be similar to step S200 except for using the set temperature sensor.

At least one of a plurality of driving parameters required for operating the plurality of nonvolatile memories (or memory packages) is adaptively changed based on at least one of the monitored temperature information, the monitored set temperature information and the obtained standing time information (step S400a). The at least one of the plurality of driving parameters is adaptively and selectively changed for each nonvolatile memory (or each memory package). Step S400a in FIG. 18 may be similar to step S400 in FIG. 1 except for further using the set temperature sensor.

Figure 19:
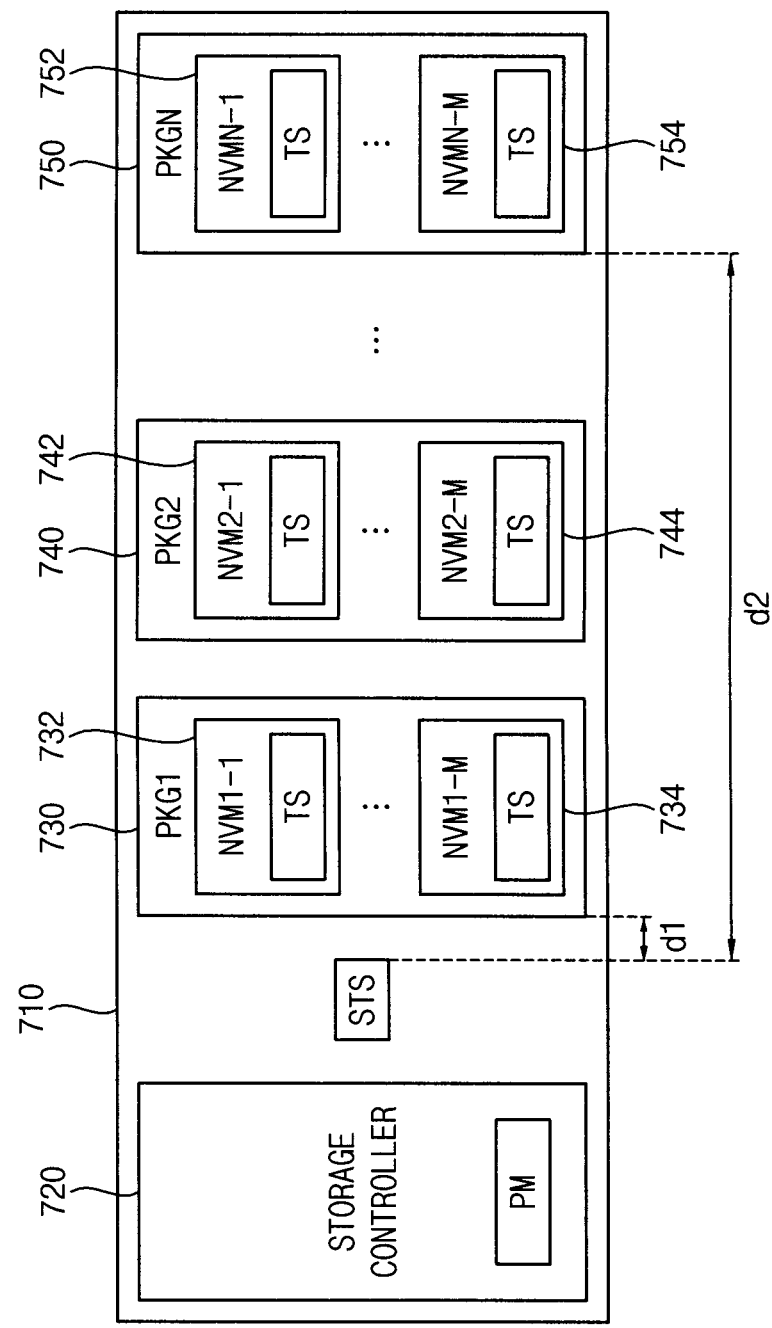
FIG. 19 is a plan view of another example in which a storage controller and nonvolatile memories are disposed in a storage device according to example embodiments.

FIG. 19 is a plan view of an example in which a storage controller and a plurality of memory packages each of which having at least one nonvolatile memory are disposed in a storage device according to example embodiments. The descriptions repeated with FIG. 13 will be omitted.

Referring to FIG. 19, a storage device of FIG. 19 may be substantially the same as the storage device of FIG. 13, except that the storage device of FIG. 19 further includes a set temperature sensor STS.

Unlike the temperature sensor TS included in each of the plurality of nonvolatile memories 732, 734, 743, 744, 752 and 754, the set temperature sensor STS may not be included in the storage controller 720 or the plurality of nonvolatile memories 732, 734, 743, 744, 752 and 754, and may be formed separately and mounted on the printed circuit board 710. For example, the set temperature sensor STS may be disposed relatively closer to the storage controller 720 than the temperature sensor TS of each of the plurality of nonvolatile memories 732, 734, 743, 744, 752 and 754.

Distances between the set temperature sensor STS and the plurality of memory packages 730, 740 and 750 may be different from each other. As illustrated in FIG. 19, a distance between the set temperature sensor STS and the memory package 730 may be a first distance d1, and a distance between the set temperature sensor STS and the memory package 750 may be a second distance d2 longer than the first distance d1. For example, the first distance d1 may be shorter than a reference distance, and the second distance d2 may be longer than the reference distance. For another example, the first distance d1 may be shorter than a first reference distance, and the second distance d2 may be longer than a second reference distance longer than the first reference distance.

FIGS. 20, 21, 22 and 23 are flowcharts illustrating examples of adaptively changing at least one of a plurality of driving parameters in FIG. 18.

Figure 20:
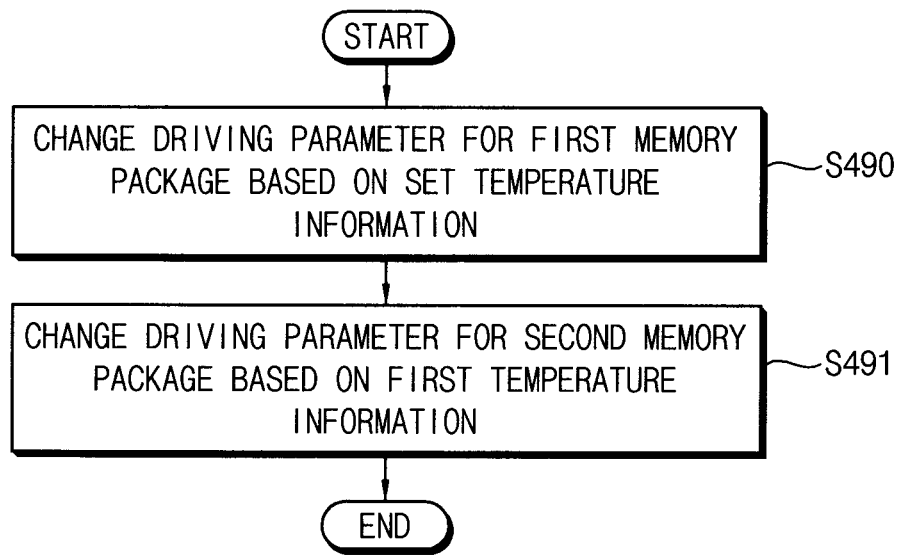
FIGS. 20, 21, 22 and 23 are flowcharts illustrating examples of adaptively changing at least one of a plurality of driving parameters in FIG. 18.

Referring to FIGS. 19 and 20, when the at least one of the plurality of driving parameters is adaptively changed (step S400a), a driving parameter required for operating a first memory package may be changed based on the set temperature information (step S490), and a driving parameter required for operating a second memory package may be changed based on first temperature information (step S491). A distance between the set temperature sensor and the first memory package may be closer than a reference distance, and a distance between the set temperature sensor and the second memory package may be farther than the reference distance. The first temperature information may be obtained from the second memory package. In other words, temperature information of a memory package (or at least one nonvolatile memory therein) relatively close to the set temperature sensor STS may be replaced by utilizing the set temperature information of the set temperature sensor, and temperature information of a memory package (at least one nonvolatile memory therein) relatively far from the set temperature sensor may be applied by checking its own temperature information.

Figure 21:
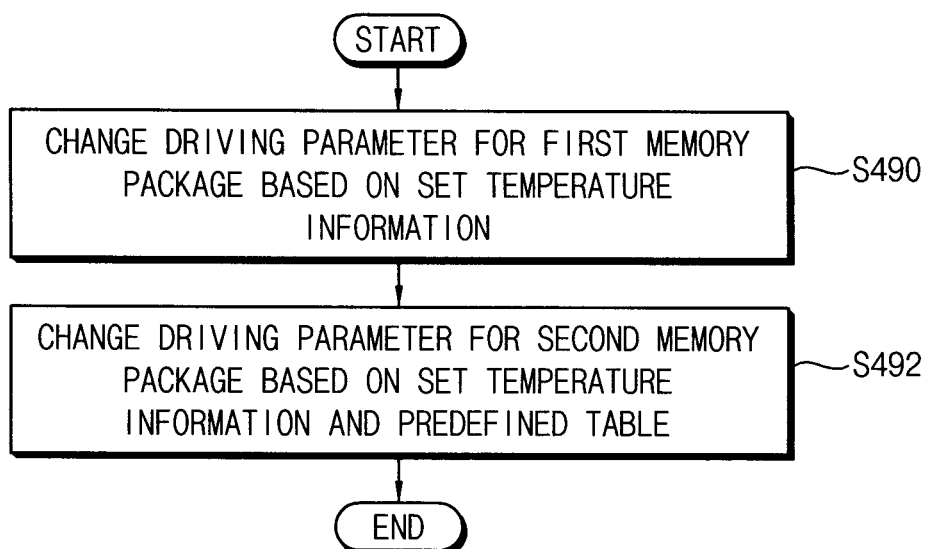

Referring to FIGS. 19 and 21, when the at least one of the plurality of driving parameters is adaptively changed (step S400a), step S490 in FIG. 21 may be substantially the same as step S490 in FIG. 20. The driving parameter for the second memory package may be changed based on the set temperature information and a predefined table (step S492). In other words, the temperature information of the memory package relatively far from the set temperature sensor STS may be applied with reference to the predefined table according to the temperature of the set temperature sensor.

Figure 22:
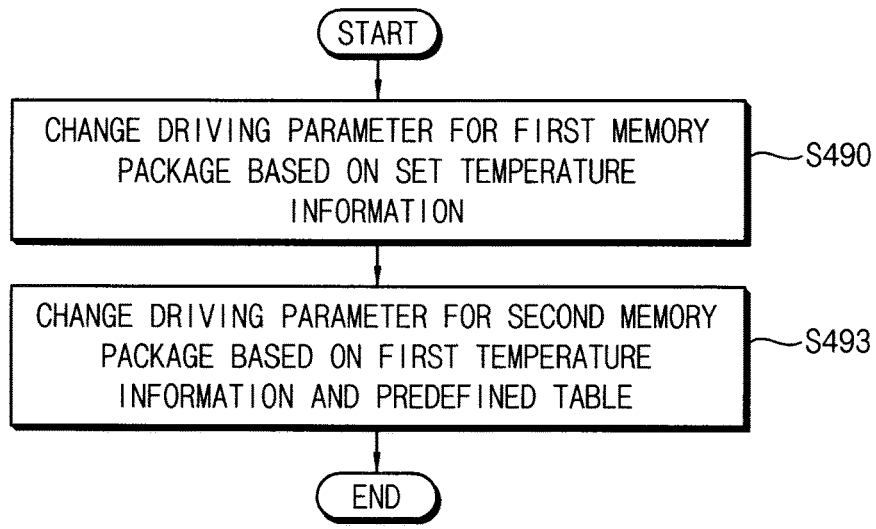

Referring to FIG. 22, when the at least one of the plurality of driving parameters is adaptively changed (step S400a), step S490 in FIG. 22 may be substantially the same as step S490 in FIG. 20. The driving parameter for the second memory package may be changed based on the first temperature information and a predefined table (step S493). The predefined table may include compensated temperatures according to the temperature of the first temperature information.

Figure 23:
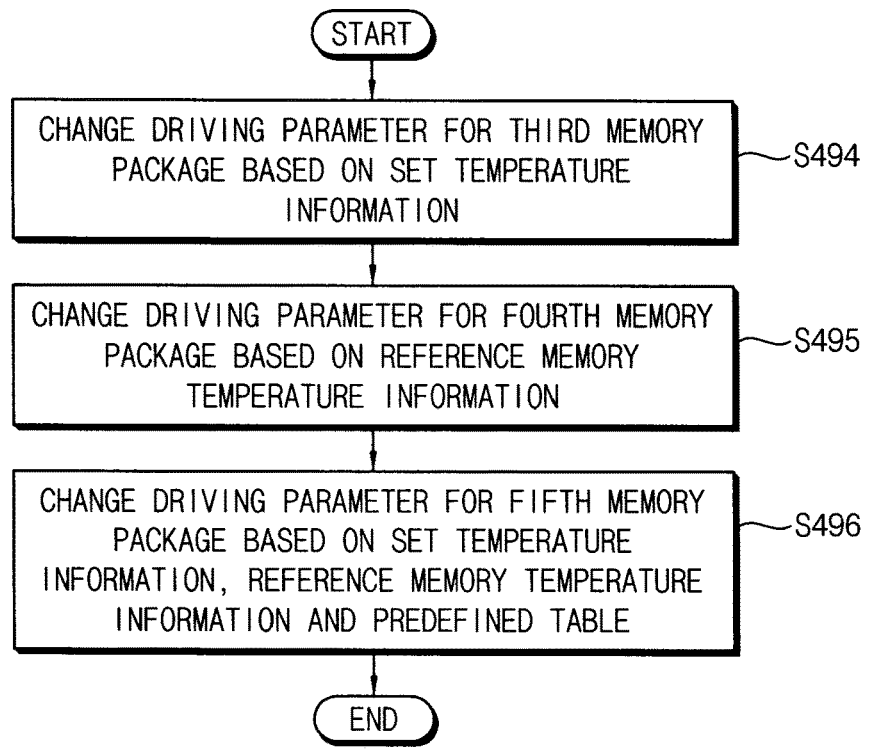

Referring to FIGS. 19 and 23, the at least one of the plurality of driving parameters is adaptively changed (step S400a), a driving parameter required for operating a third memory package may be changed based on the set temperature information (step S494), a driving parameter required for operating a fourth memory package may be changed based on reference memory temperature information (step S495), and a driving parameter required for operating a fifth memory package may be changed based on the set temperature information, the reference memory temperature information and a predefined table (step S496). A distance between the set temperature sensor STS and the third memory package may be closer than a first reference distance, a distance between the set temperature sensor STS and the fourth memory package may be farther than a second reference distance longer than the first reference distance, and a distance between the set temperature sensor STS and the fifth memory package may be between the first reference distance and the second reference distance. The reference memory temperature information may be obtained from the fourth memory package.

Each of steps S490, S491, S492, S493, S494, S495 and S496 in FIGS. 20, 21, 22 and 23 may be implemented with at least one of the examples described with reference to FIGS. 5, 6, 7, 8, 9, 10, 11 and 12.

Although examples of FIGS. 20, 21, 22 and 23 have been described with respect to a nonvolatile memory, example embodiments are not limited thereto, and the examples of FIGS. 20, 21, 22 and 23 may be implemented with respect to a memory package.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 24:
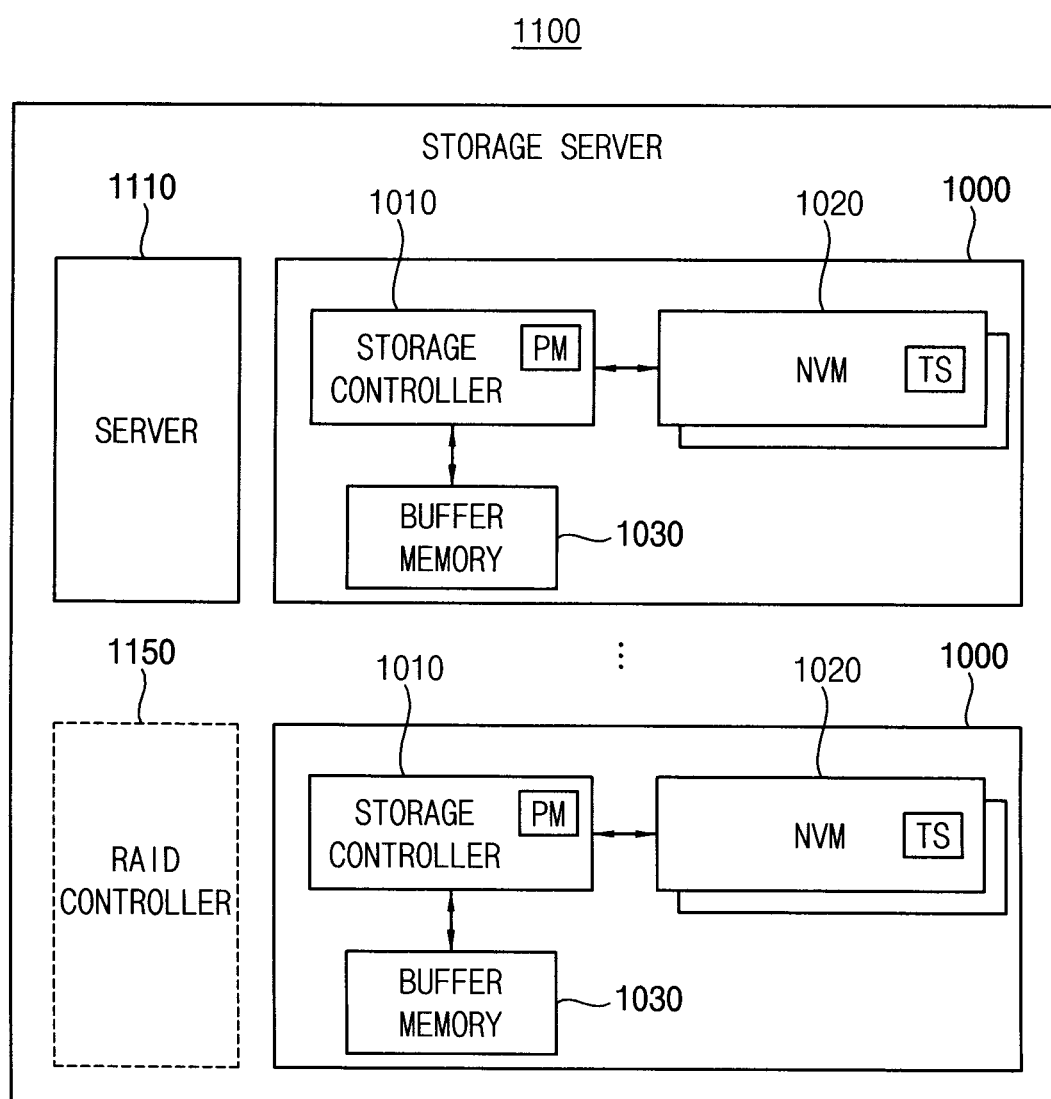
FIG. 24 is a block diagram illustrating a storage server including a storage device according to example embodiments.

FIG. 24 is a block diagram illustrating a storage server including a storage device according to example embodiments.

Referring to FIG. 24, a storage server 1100 may include a server 1110, a plurality of storage devices 1000 which store data for operating the server 1110, and a redundant array of independent drives (RAID) controller 1150 for controlling the plurality of storage devices 1000.

The RAID techniques are mainly used in data servers where important data can be replicated in more than one location across a plurality a plurality of storage devices. The RAID controller 1150 may enable one of a plurality of RAID levels according to RAID information, and may interface data between the server 1110 and the plurality of storage devices 1000.

Each of the plurality of storage devices 1000 may include a storage controller 1010 including a period measurer PM, a plurality of nonvolatile memories 1020 including a temperature sensor TS, and a buffer memory 330. Each of the plurality of storage devices 1000 may correspond to the storage device 300 according to example embodiments, and may operate according to example embodiments described above with reference to FIGS. 1 through 23. The server 1110 may correspond to the host 200 of FIG. 2, and may control the plurality of storage devices 1000.

The inventive concept may be applied to various electronic devices and/or systems including the storage device and the storage system. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a storage device including a plurality of nonvolatile memories, each of the plurality of nonvolatile memories including a temperature sensor, the method comprising:
   checking whether a predetermined temperature check cycle for the plurality of nonvolatile memories has been reached;
   monitoring, in response to a checking result of whether the predetermined temperature check cycle has been reached, temperature information of at least one of the plurality of nonvolatile memories using the temperature sensor;
   obtaining standing time information of each of the plurality of nonvolatile memories by applying a temperature acceleration condition based on the monitored temperature information; and
   changing at least one of a plurality of driving parameters required for operating each of the plurality of nonvolatile memories based on at least one of the monitored temperature information and the obtained standing time information.

2. The method of claim 1, wherein:
   the storage device further includes a storage controller configured to control operations of the plurality of nonvolatile memories, and
   the monitoring of the temperature information is performed by the storage controller without a command received from an external host.

3. The method of claim 2, wherein:
   the plurality of nonvolatile memories are disposed in a plurality of memory packages so that each of the plurality of memory packages includes at least one nonvolatile memory of the plurality of nonvolatile memories, and
   the monitoring of the temperature information includes:
   selecting a first memory package among the plurality of memory packages as a reference memory package; and
   monitoring only the first memory package to obtain first temperature information as the temperature information from at least one nonvolatile memory included in the first memory package.

4. The method of claim 3,
   wherein the plurality of driving parameters includes:
   changing a driving parameter required for operating the first memory package based on the first temperature information; and
   changing a driving parameter required for operating each of remaining memory packages other than the first memory package based on the first temperature information and a predefined table.

5. The method of claim 3, wherein:
   the storage device further includes a set temperature sensor disposed between the storage controller and the plurality of nonvolatile memories, and
   the method further includes:
   monitoring, in response to the checking result, set temperature information of the storage device using the set temperature sensor.

6. The method of claim 5,
   wherein the changing of the at least one of the plurality of driving parameters includes:
   changing a driving parameter required for operating a first nonvolatile memory based on the set temperature information, a distance between the set temperature sensor and the first nonvolatile memory is closer than a reference distance.

7. The method of claim 6,
   wherein the changing of the at least one of the plurality of driving parameters further includes:
   changing a driving parameter required for operating a second nonvolatile memory based on a predefined table and one of the set temperature information and the temperature information, a distance between the set temperature sensor and the second nonvolatile memory is farther than the reference distance.

8. The method of claim 1,
   wherein the plurality of driving parameters includes a parameter associated with a prevention code among defensive codes for the plurality of nonvolatile memories.

9. The method of claim 8,
   wherein the parameter associated with the prevention code includes a patrol read cycle of a patrol read operation for a first nonvolatile memory among the plurality of nonvolatile memories.

10. The method of claim 8,
    wherein the parameter associated with the prevention code includes a refresh operation for a first nonvolatile memory among the plurality of nonvolatile memories.

11. The method of claim 8,
    wherein the parameter associated with the prevention code includes a level of a read voltage of a read operation for a first nonvolatile memory among the plurality of nonvolatile memories based on a temperature bump table.

12. The method of claim 1,
    wherein the plurality of driving parameters includes a parameter associated with a recovery code among defensive codes for the plurality of nonvolatile memories.

13. The method of claim 12,
    wherein the parameter associated with the recovery code includes an application order of a plurality of recovery algorithms for a first nonvolatile memory among the plurality of nonvolatile memories.

14. The method of claim 13, wherein:
    the first nonvolatile memory includes a plurality of memory blocks, and the application order of the plurality of recovery algorithms is differently set for each memory block.

15. The method of claim 13, wherein:
the first nonvolatile memory includes a plurality of memory blocks,
each of the plurality of memory blocks includes a plurality of pages, and
the application order of the plurality of recovery algorithms is differently set for each page.

16. The method of claim 1,
wherein the plurality of driving parameters includes at least one parameter associated with a program condition of a program operation for a first nonvolatile memory among the plurality of nonvolatile memories or at least one parameter associated with an erase condition of an erase operation for the first nonvolatile memory.

17. The method of claim 1,
wherein the monitoring of the temperature information includes:
selecting a first nonvolatile memory among the plurality of nonvolatile memories as a reference nonvolatile memory; and
monitoring only the first nonvolatile memory to obtain first temperature information as the temperature information from the first nonvolatile memory.

18. The method of claim 17,
wherein the changing of the at least one of the plurality of driving parameters includes:
changing a driving parameter required for operating the first nonvolatile memory based on the first temperature information; and
changing driving parameters required for operating each of remaining nonvolatile memories other than the first nonvolatile memory based on the first temperature information and a predefined table.

19. A storage device comprising:
a plurality of nonvolatile memories, each of the plurality of nonvolatile memories including a temperature sensor; and
a storage controller configured to control operations of the plurality of nonvolatile memories, to check whether a predetermined temperature check cycle for the plurality of nonvolatile memories has been reached, to monitor, in response to a checking result of whether the predetermined temperature check cycle has been reached, temperature information of at least one of the plurality of nonvolatile memories using the temperature sensor, to obtain standing time information of each of the plurality of nonvolatile memories by applying a temperature acceleration condition based on the monitored temperature information, and to change at least one of a plurality of driving parameters required for operating each of the plurality of nonvolatile memories based on at least one of the monitored temperature information and the obtained standing time information.

20. A storage system comprising:
a host; and
a storage device accessed by the host and including a plurality of nonvolatile memories and a storage controller, each of the plurality of nonvolatile memories including a temperature sensor, the storage controller configured to control operations of the plurality of nonvolatile memories,
wherein the storage controller is configured to check whether a predetermined temperature check cycle for the plurality of nonvolatile memories has been reached, to monitor, in response to a checking result of whether the predetermined temperature check cycle has been reached, temperature information of at least one of the plurality of nonvolatile memories using the temperature sensor, to obtain standing time information of each of the plurality of nonvolatile memories by applying a temperature acceleration condition based on the monitored temperature information, and to change at least one of a plurality of driving parameters required for operating each of the plurality of nonvolatile memories based on at least one of the monitored temperature information and the obtained standing time information.

* * * * *